(12) United States Patent  (10) Patent No.: US 7,354,051 B2
Ohki et al.  (45) Date of Patent: Apr. 8, 2008

(54) INDEPENDENT SUSPENSION SYSTEM FOR A WHEELED VEHICLE

(75) Inventors: Toshiyuki Ohki, Kanagawa (JP); Michihito Hirahara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 470 days.

(21) Appl. No.: 10/968,184

(22) Filed: Oct. 20, 2004

(65) Prior Publication Data

US 2005/0087941 A1   Apr. 28, 2005

(30) Foreign Application Priority Data

Oct. 24, 2003  (JP) ............................. 2003-364765
Dec. 17, 2003  (JP) ............................. 2003-419582

(51) Int. Cl.
*B60G 3/016* (2006.01)

(52) U.S. Cl. ................. 280/124.131; 280/124.127; 280/124.153; 280/124.163; 280/124.17; 280/6.155

(58) Field of Classification Search ......... 280/124.163, 280/124.128, 124.153, 124.116, 124.127, 280/124.17, 6.155, 124.131
See application file for complete search history.

(56) References Cited

U.S. PATENT DOCUMENTS

| 1,915,649 | A | * | 6/1933 | Devillers | 280/124.106 |
| 1,984,694 | A | * | 12/1934 | Nottoli | 267/68 |
| 2,054,063 | A | * | 9/1936 | Chedru | 267/238 |
| 2,417,214 | A | * | 3/1947 | Roos | 180/360 |
| 2,805,868 | A | * | 9/1957 | Madden | 280/124.127 |
| 2,888,268 | A | * | 5/1959 | Fellabaum | 280/684 |
| 3,278,197 | A | * | 10/1966 | Gerin | 280/124.101 |
| 3,361,445 | A | * | 1/1968 | Harbers | 280/86.75 |
| 3,380,748 | A | * | 4/1968 | Martin | 280/124.161 |
| 4,000,910 | A | * | 1/1977 | Unruh et al. | 280/5.514 |
| 4,087,115 | A | * | 5/1978 | Earle | 280/124.17 |
| 4,165,099 | A | * | 8/1979 | Wagner et al. | 280/124.116 |
| 4,487,429 | A | * | 12/1984 | Ruggles | 280/5.521 |
| 4,616,849 | A | * | 10/1986 | Matsumoto et al. | 280/124.116 |
| 4,678,204 | A | * | 7/1987 | Hetherington | 280/124.17 |
| 4,783,095 | A | * | 11/1988 | Rampini et al. | 280/124.127 |
| 4,875,706 | A | * | 10/1989 | Joseph et al. | 280/124.127 |
| 4,972,920 | A | * | 11/1990 | Zamitter et al. | 180/227 |
| 4,995,636 | A | * | 2/1991 | Hall et al. | 280/124.116 |
| 5,016,904 | A | * | 5/1991 | Weber | 280/124.111 |
| 5,351,986 | A | * | 10/1994 | Hedenberg et al. | 280/124.163 |

(Continued)

FOREIGN PATENT DOCUMENTS

DE         43 27 909 A1      3/1995

(Continued)

*Primary Examiner*—Paul N. Dickson
*Assistant Examiner*—Timothy D. Wilhelm
(74) *Attorney, Agent, or Firm*—Foley & Lardner LLP

(57) ABSTRACT

An independent suspension system for a wheeled vehicle includes a modified shock absorber, a leaf spring, and a wheel carrier. The shock absorber includes a cylinder, and a rod passing through the cylinder. The shock absorber is vertically mounted in a condition where the ends of the rod are coupled to the vehicle body. The cylinder of the shock absorber is coupled to the wheel carrier. The leaf spring supports the wheel carrier against rotation on a vertical axis of the vehicle. The leaf spring is elastically twisted to cancel a moment that causes a friction within the shock absorber.

16 Claims, 21 Drawing Sheets

U.S. PATENT DOCUMENTS

| | | | | |
|---|---|---|---|---|
| 5,468,018 | A * | 11/1995 | Redman et al. | 280/788 |
| RE35,168 | E * | 3/1996 | Golpe | 280/124.116 |
| 5,507,516 | A * | 4/1996 | Reast | 280/124.106 |
| 5,636,857 | A * | 6/1997 | Tandy et al. | 280/124.165 |
| 5,860,661 | A * | 1/1999 | Boucher et al. | 280/124.128 |
| 6,062,579 | A * | 5/2000 | Fortier | 280/124.1 |
| 6,158,773 | A * | 12/2000 | Verhaeghe | 280/787 |
| 6,170,838 | B1 * | 1/2001 | Laurent et al. | 280/5.508 |
| 6,241,262 | B1 * | 6/2001 | Suess | 280/5.522 |
| 6,357,770 | B1 * | 3/2002 | Carpiaux et al. | 280/124.127 |
| 6,488,299 | B2 * | 12/2002 | Kim | 280/124.128 |
| 6,530,587 | B2 * | 3/2003 | Lawson et al. | 280/124.17 |
| 6,550,795 | B1 * | 4/2003 | Schlosser et al. | 280/86.75 |
| 6,676,160 | B2 * | 1/2004 | Stanley | 280/797 |
| 6,805,370 | B2 * | 10/2004 | Raleigh et al. | 280/124.175 |
| 2001/0035623 | A1 * | 11/2001 | Wagner | 280/124.128 |
| 2003/0111814 | A1 * | 6/2003 | Sutton et al. | 280/124.131 |
| 2004/0090032 | A1 * | 5/2004 | Raleigh et al. | 280/124.17 |
| 2004/0155425 | A1 * | 8/2004 | Schluntz | 280/124.128 |
| 2004/0164513 | A1 * | 8/2004 | Svartz et al. | 280/124.128 |
| 2005/0093260 | A1 * | 5/2005 | Trescott | 280/86.5 |
| 2006/0213701 | A1 * | 9/2006 | Durif | 180/24 |

FOREIGN PATENT DOCUMENTS

| | | |
|---|---|---|
| FR | 653661 | 3/1929 |
| FR | 830971 | 8/1938 |
| JP | 9-2039 A | 1/1997 |
| JP | 10-76826 A | 3/1998 |

\* cited by examiner

AT REST

ON COMPRESSION

ON REBOUND

INDEPENDENT SUSPENSION SYSTEM FOR A WHEELED VEHICLE

BACKGROUND OF THE INVENTION

The present invention relates generally to independent suspension systems for wheeled vehicles that allow each wheel to move up and down without undue influence on the other wheels, and more particularly to a compact or space-saving independent suspension system occupying as little underfloor space as possible to provide a large interior space for a wheeled vehicle.

In recent years, there have been disclosed various independent suspension systems for wheeled vehicles that allow each wheel to move up and down without undue influence on the other wheels. A Published Japanese Patent Application Publication No. H10(1998)-076826 (hereinafter referred to as "JP10-076826") shows a rear independent suspension system for a wheeled vehicle including a trailing member (indicated by "swing arm" in JP10-076826) extending in a longitudinal direction of the vehicle to rotatably support a wheel and to retain the wheel in a proper longitudinal position against rotation on a vertical axis of the vehicle, and an upper lateral link and a lower lateral link (indicated by "upper link" and "lower link" in JP10-076826) each extending under the floor of the vehicle in a lateral direction of the vehicle to retain the wheel in a proper lateral position against rotation on a longitudinal axis of the vehicle, and to allow the wheel to travel on the compression and on the rebound in a vertical direction of the vehicle.

SUMMARY OF THE INVENTION

Such a conventional independent suspension system as disclosed in JP10-076826 includes a lateral link extending under the floor of a vehicle in a lateral direction to retain a wheel or a wheel carrier in a proper lateral position at a proper camber angle, resulting in the following disadvantages. While the wheel carrier is traveling on the compression or on the rebound in a vertical direction of the vehicle, the lateral link is swinging on an attachment point at which the lateral link is coupled to the vehicle body. This motion needs a space under the floor of the vehicle. This allocated space for the lateral link leads to a projection in the floor of the vehicle to decrease the interior space.

It is an object of the present invention to provide an independent suspension system for a wheeled vehicle that occupies as little underfloor space as possible to provide a large interior space for the vehicle.

According to one aspect of the present invention, an independent suspension system for a wheeled vehicle, comprises a slide guide mounted on a vehicle body of the vehicle, and held against motion in a lateral direction of the vehicle, a slider mounted on the slide guide for motion in a vertical direction of the vehicle against a load imposed thereon, and a wheel carrier mounted on the slider, for rotatably mounting thereon a wheel of the vehicle.

According to another aspect of the invention, an independent suspension system for a wheeled vehicle, comprises wheel support means for rotatably mounting thereon a wheel of the vehicle, sliding means for supporting the wheel carrier, and guiding means for supporting the sliding means for motion in a vertical direction of the vehicle against a load imposed on the sliding means.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
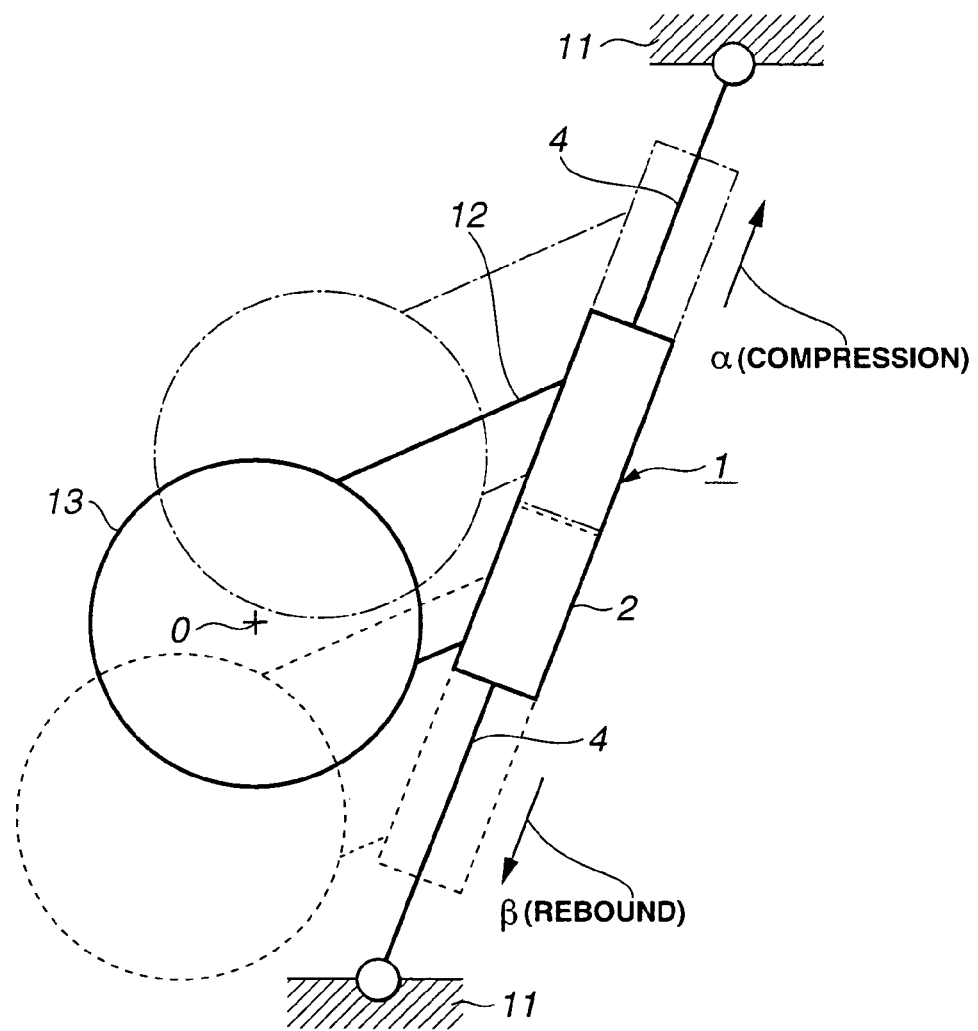
FIG. 1 is a schematic diagram showing a part of an independent suspension system for a wheeled vehicle in accordance with an embodiment of the present invention.
Figure 2:
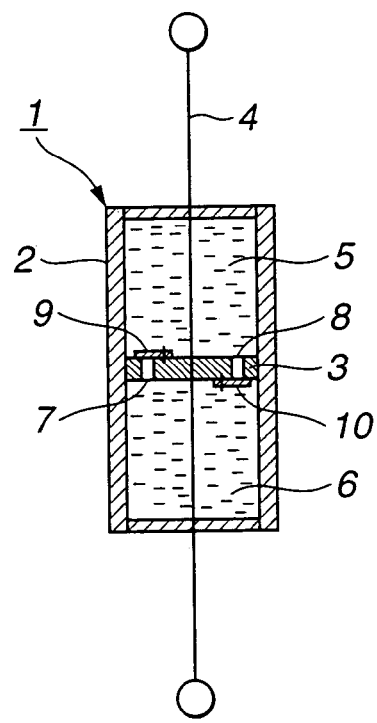
FIG. 2 is a schematic diagram showing a side sectional view of a shock absorber available in the independent suspension system of FIG. 1.

Referring now to FIG. 1, there is shown a schematic diagram showing a main concept of an independent suspension system for a wheeled vehicle in accordance with an embodiment of the present invention, viewed from the left side of the vehicle. The suspension system of this embodiment is suitable for a rear independent suspension system. This suspension system employs a modified shock absorber 1. As shown in FIG. 2, shock absorber 1 includes a cylinder 2, a piston 3 slidably mounted within cylinder 2, and a rod 4 coupled to piston 3. Rod 4 is slidably supported on cylinder 2 for relative motion along a longitudinal axis of cylinder 2, held against motions in all radial directions in the plane normal to the longitudinal axis. Piston 3 defines a pair of fluid chambers 5, 6. Rod 4 extends through fluid chambers 5 and 6, and through both end portions of cylinder 2. Piston 3 includes communication holes 7, 8 communicating fluid chambers 5 and 6. Elastic valve elements 9, 10 are disposed in fluid chambers 5, 6, covering communication holes 7, 8, respectively, to serve as an oscillation damping valve to produce the following function. While piston 3 is traveling upward in FIG. 2 with respect to cylinder 2, hydraulic fluid in fluid chamber 5 flows into fluid chamber 6 via communication hole 8, pressing valve element 10 to open. The fluid resistance of this flow produces a damping force imposed downward on piston 3. On the other hand, while piston 3 is traveling downward in FIG. 2 with respect to cylinder 2, hydraulic fluid in fluid chamber 6 flows into fluid chamber 5 via communication hole 7, pressing valve element 9 to open. The fluid resistance of this flow produces a damping force imposed upward on piston 3. Constructed in this manner, shock absorber 1 controls an oscillatory motion between rod 4 and cylinder 2.

As shown in FIG. 1, shock absorber 1 as discussed above is mounted in the suspension system for relative motion between cylinder 2 and rod 4 in a vertical direction of the vehicle. More specifically, shock absorber 1 is inclined rearward with the top end located behind the bottom end, so that the vehicle bears an anti-dive feature to minimize a nose-dive movement in braking. The both ends of rod 4 are coupled to a vehicle body 11 of the vehicle. Cylinder 2 is coupled to a wheel carrier 13 as a member of an axle via a bracket 12. Wheel carrier 13 rotatably supports a left rear wheel (not shown) including a rotational center 0. Thus, the suspension system includes rod 4 as a slide guide mounted on a vehicle body of the vehicle, and held against motion in a lateral direction of the vehicle, cylinder 2 as a slider mounted on rod 4 for motion in a vertical direction of the vehicle against a load imposed thereon, and wheel carrier 13 mounted on cylinder 2, for rotatably mounting thereon a wheel of the vehicle.

Figure 3:
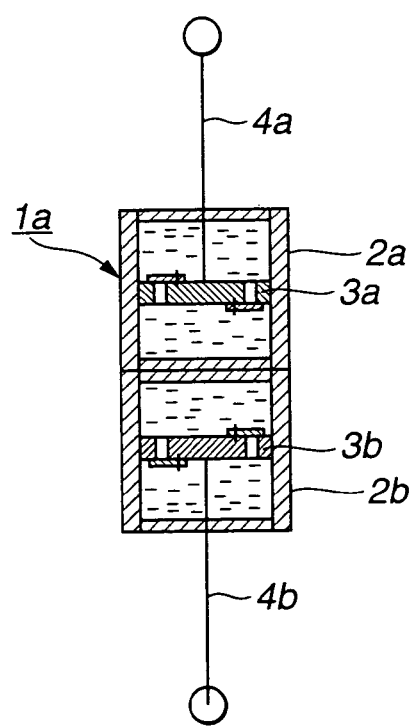
FIG. 3 is a schematic diagram showing a side sectional view of another shock absorber available in the independent suspension system of FIG. 1.
Figure 4:
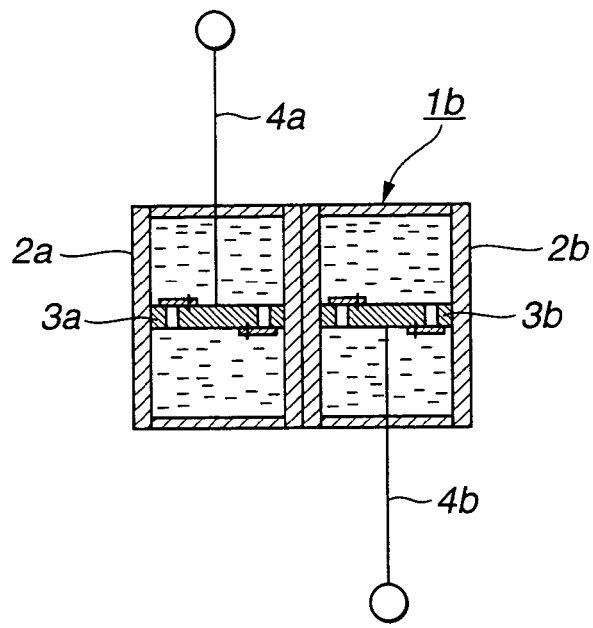
FIG. 4 is a schematic diagram showing a side sectional view of still another shock absorber available in the independent suspension system of FIG. 1.

Shock absorber 1 may be replaced with a shock absorber 1a shown in FIG. 3, or with a shock absorber 1b shown in FIG. 4. As shown in FIG. 3, shock absorber 1a includes a pair of normal shock absorbers coaxially coupled to each other. That is, shock absorber 1a includes two cylinders 2a, 2b, two pistons 3a, 3b slidably mounted within cylinders 2a, 2b, respectively, and two rods 4a, 4b coupled to pistons 3a, 3b. Rod 4a as a first rod extends outward through one end portion of cylinder 2a as a first cylinder. Rod 4b as a second rod extends outward through one end portion of cylinder 2b as a second cylinder. Cylinders 2a and 2b are coaxially coupled by the other end portions. Pistons 3a and 3b include communication holes and elastic valve elements to produce a damping force imposed thereon, as in case of shock absorber 1. Shock absorber 1a may be mounted in a vertical position with ends of rods 4a and 4b coupled to vehicle body 11, as in case of shock absorber 1 shown in FIG. 1. In this manner, shock absorber 1a is constructed by using typical shock absorbers.

As shown in FIG. 4, shock absorber 1b includes a pair of normal shock absorbers coupled to each other in parallel. That is, shock absorber 1b includes two cylinders 2a, 2b, two pistons 3a, 3b slidably mounted within cylinders 2a, 2b, respectively, and two rods 4a, 4b coupled to pistons 3a, 3b. Rod 4a extends outward through one end portion of cylinder 2a. Rod 4b extends outward through one end portion of cylinder 2b. Cylinders 2a and 2b are coupled in parallel with rod 4a and rod 4b oriented in opposite directions. Pistons 3a and 3b include communication holes and elastic valve elements to produce a damping force imposed thereon, as in case of shock absorber 1. Shock absorber 1a may be mounted in a vertical position with ends of rods 4a and 4b coupled to vehicle body 11, as in case of shock absorber 1 shown in FIG. 1. In this manner, shock absorber 1b includes an upper rod and a lower rod with displaced axes, constructed by using typical shock absorbers.

The structure to hold wheel carrier 13 against rotation on a vertical axis of the vehicle may be configured as shown in FIGS. 5 through 10.

Figure 5:
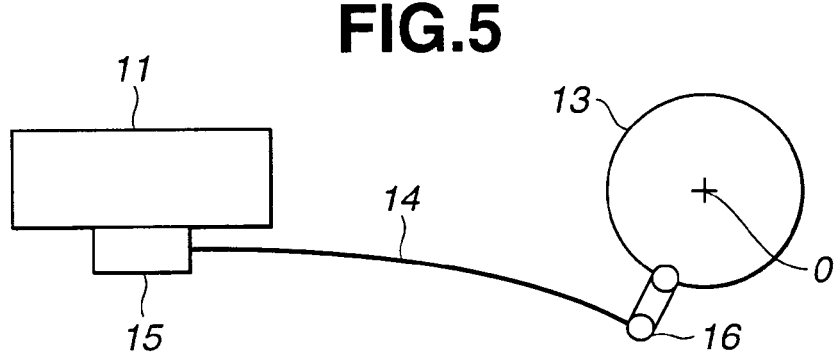
FIG. 5 is a schematic diagram showing a first embodiment of a structure to hold a wheel carrier against rotation on a vertical axis of the vehicle in the independent suspension system of FIG. 1.

In FIG. 5, the support structure employs a leaf spring 14 as a trailing member extending rearward in the longitudinal direction of the vehicle and connected between a mounting portion of vehicle body 11 and wheel carrier 13. The front end of leaf spring 14 is rigidly connected to vehicle body 11 via a bracket 15. The rear end of leaf spring 14 is connected to wheel carrier 13 via a hinge-type shackle 16. Mounted in this manner, leaf spring 14 holds wheel carrier 13 against rotation on a vertical axis of the vehicle. Accordingly, leaf spring 14 bears both a function of a suspension spring to produce a restoring force in accordance with a displacement of wheel carrier 13 and a function of a trailing link to hold wheel carrier 13 against rotation on a vertical direction of the vehicle.

Figure 6:
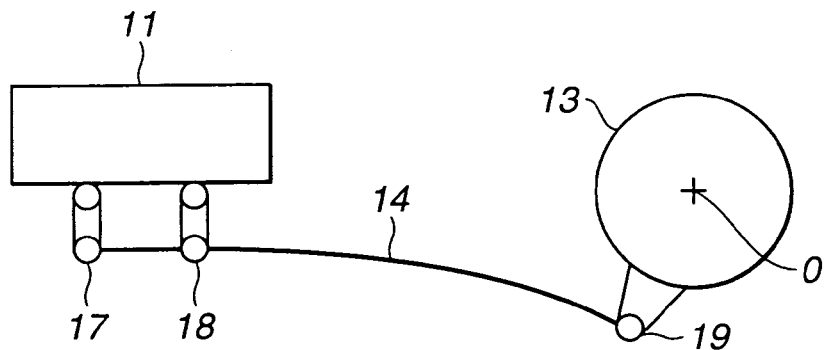
FIG. 6 is a schematic diagram showing a second embodiment of the structure to hold the wheel carrier against rotation on the vertical axis of the vehicle in the independent suspension system of FIG. 1.

In FIG. 6, the support structure employs leaf spring 14 as a trailing member extending rearward in the longitudinal direction of the vehicle between a mounting portion of vehicle body 11 and wheel carrier 13 to hold wheel carrier 13 against rotation on a vertical axis of the vehicle, as in the case of FIG. 5. The front end portion of leaf spring 14 is connected to vehicle body 11 via a pair of hinge-type shackles 17 and 18. The rear end of leaf spring 14 is connected to wheel carrier 13 via a pin or a pivot shackle 19.

Figure 7:
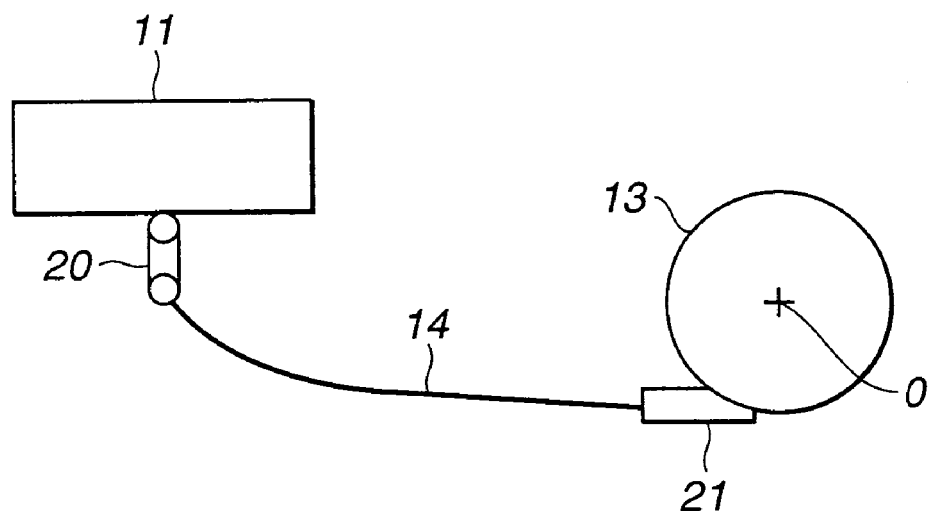
FIG. 7 is a schematic diagram showing a third embodiment of the structure to hold the wheel carrier against rotation on the vertical axis of the vehicle in the independent suspension system of FIG. 1.

In FIG. 7, the support structure employs leaf spring 14 as a trailing member extending rearward in the longitudinal direction of the vehicle between a mounting portion of vehicle body 11 and wheel carrier 13 to hold wheel carrier 13 against rotation on a vertical axis of the vehicle, similarly. The front end portion of leaf spring 14 is connected to vehicle body 11 via a hinge-type shackle 20. The rear end of leaf spring 14 is rigidly connected to wheel carrier 13 via a bracket 21.

Figure 8:
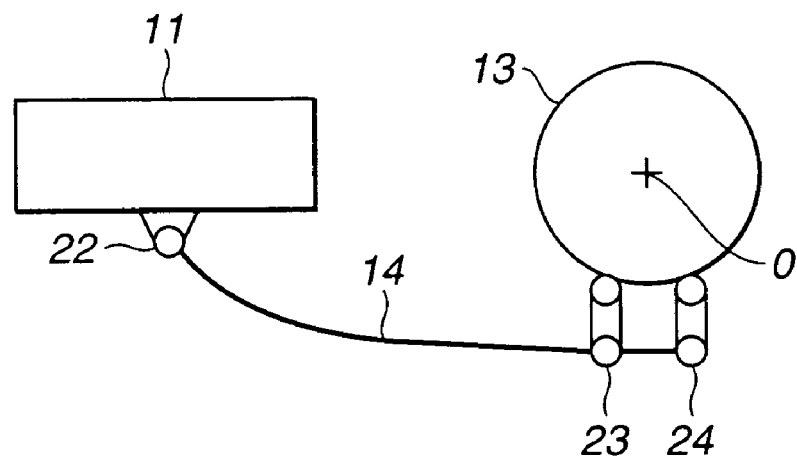
FIG. 8 is a schematic diagram showing a fourth embodiment of the structure to hold the wheel carrier against rotation on the vertical axis of the vehicle in the independent suspension system of FIG. 1.

In FIG. 8, the support structure employs leaf spring 14 as a trailing member extending rearward in the longitudinal direction of the vehicle between a mounting portion of vehicle body 11 and wheel carrier 13 to hold wheel carrier 13 against rotation on a vertical axis of the vehicle, similarly. The front end of leaf spring 14 is pin-connected to vehicle body 11 via a pin 22. The rear end portion of leaf spring 14 is connected to wheel carrier 13 via a pair of hinge-type shackles 23 and 24.

Figure 9:
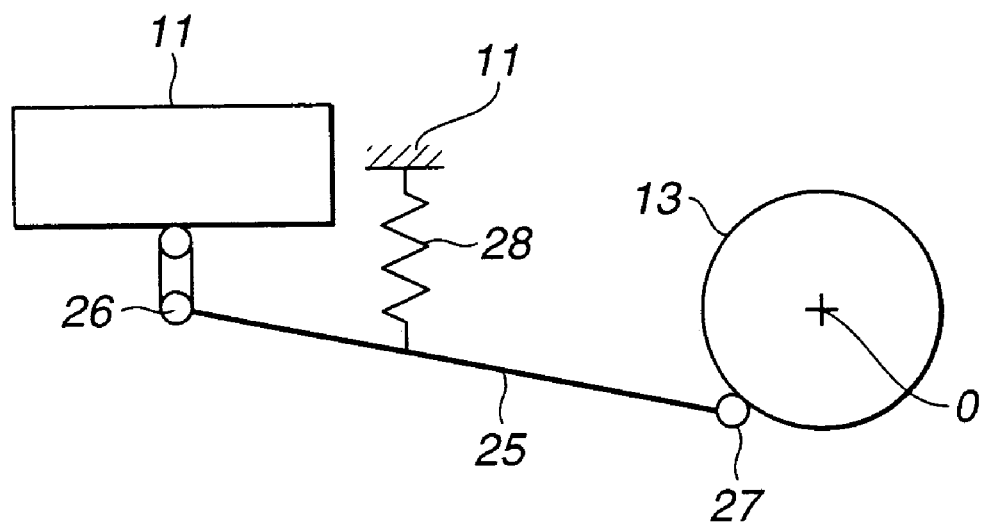
FIG. 9 is a schematic diagram showing a fifth embodiment of the structure to hold the wheel carrier against rotation on the vertical axis of the vehicle in the independent suspension system of FIG. 1.

In FIG. 9, the support structure employs a trailing link 25 as a trailing member extending rearward in the longitudinal direction of the vehicle between a mounting portion of vehicle body 11 and wheel carrier 13 to hold wheel carrier 13 against rotation on a vertical axis of the vehicle. The front end of link 25 is connected to vehicle body 11 via a hinge-type shackle 26. The rear end of link 25 is connected to wheel carrier 13 via a pin 27. Mounted in this manner, link 25 holds wheel carrier 13 against rotation on a vertical axis of the vehicle. Link 25 bears no function of a suspension spring as in the case of leaf spring 14. To provide the function, a coil spring 28 is bridged between vehicle body 11 and a midpoint of link 25.

Figure 10:
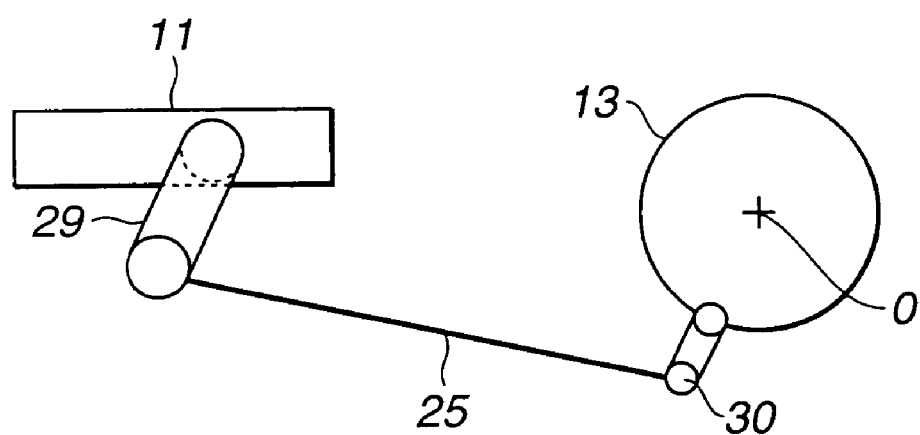
FIG. 10 is a schematic diagram showing a sixth embodiment of the structure to hold the wheel carrier against rotation on the vertical axis of the vehicle in the independent suspension system of FIG. 1.

In FIG. 10, the support structure employs link 25 as a trailing member extending rearward in the longitudinal direction of the vehicle between a mounting portion of vehicle body 11 and wheel carrier 13 to hold wheel carrier 13 against rotation on a vertical axis of the vehicle, as in the case of FIG. 9. The front end of link 25 is coupled to a torsion bar 29 extending along the lateral direction of the vehicle and having the inner end coupled to vehicle body 11. The rear end of link 25 is connected to wheel carrier 13 via a hinge-type shackle 30. Mounted in this manner, link 25 holds wheel carrier 13 against rotation on a vertical axis of the vehicle. In this embodiment, an up-and-down motion of wheel carrier 13 is converted into a rotary motion of the outer end portion of torsion bar 29. Twisted between the outer end portion and the inner end portion fastened to the vehicle body, torsion bar 29 functions as a suspension spring. In summary, coil spring 28 as shown in FIG. 9 is replaced with torsion bar 29.

Figure 11A:
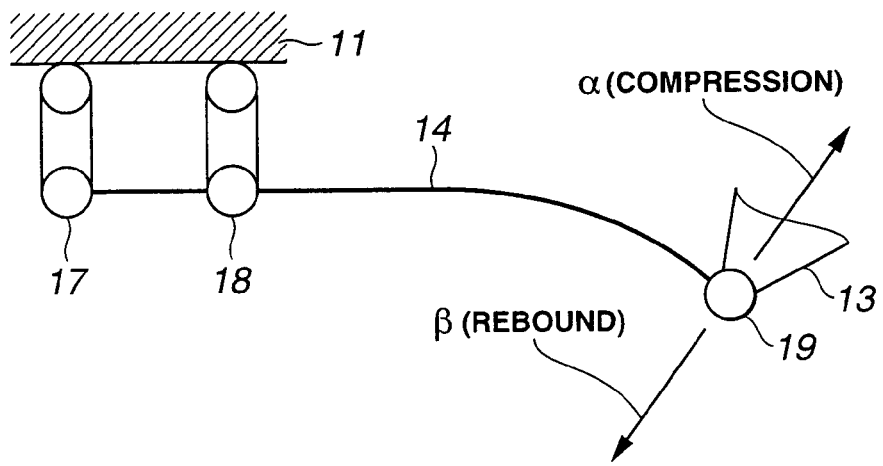
FIG. 11A is a schematic diagram showing a behavior of the structure of FIG. 6 in a neutral condition.
Figure 11B:
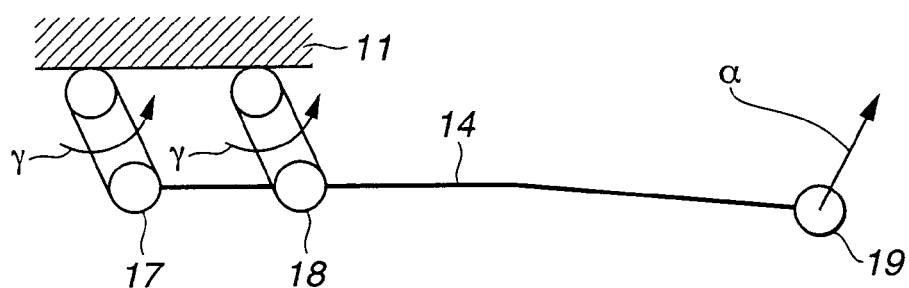
FIG. 11B is a schematic diagram showing a behavior of the structure of FIG. 6 on the compression.
Figure 11C:
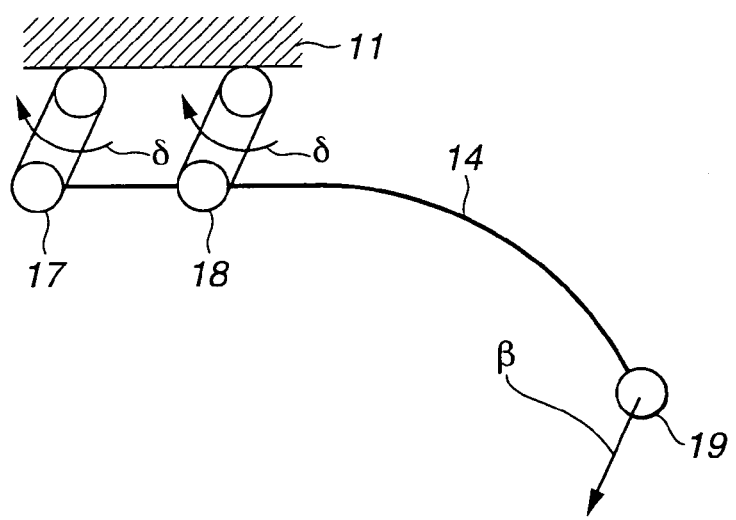
FIG. 11C is a schematic diagram showing a behavior of the structure of FIG. 6 on the rebound.

The following describes operations and behaviors of the support structure in the foregoing embodiments shown in FIGS. 5 through 10, focusing attention on a function of a hinge-type shackle. FIGS. 11A through 11B show operations of the support structure of FIG. 6. FIG. 11A shows a neutral condition where wheel carrier 13 is at rest in a neutral position with the vehicle at normal loaded height. While wheel carrier 13 is traveling on compression upward in a direction indicated by, pin 19 connecting the rear end of leaf spring 14 and wheel carrier 13 is traveling upward as shown in FIG. 11B. The upward displacement of pin 19 causes a rearward displacement of leaf spring 14. The displacement of leaf spring 14 is absorbed by the swinging motion of shackles 17 and 18 in a direction indicated by γ. Thus, shackles 17 and 18 connect vehicle body 11 and leaf spring 14 for relative longitudinal motion so as to allow upward motion of wheel carrier 13 on compression. On the other hand, FIG. 11C shows a condition where wheel carrier 13 is traveling downward on rebound. The downward displacement of pin 19 causes a forward displacement of leaf spring 14. The displacement of leaf spring 14 is absorbed by the swinging motion of shackles 17 and 18 in a direction indicated by δ. Thus, shackles 17 and 18 connect vehicle body 11 and leaf spring 14 for relative longitudinal motion so as to allow downward motion of wheel carrier 13 on compression. Therefore, the suspension system includes a coupler coupling the leaf spring to the wheel carrier or to the vehicle body for relative displacement in a longitudinal direction of the vehicle to absorb a displacement of the wheel carrier in a longitudinal direction of the vehicle.

Figure 12:
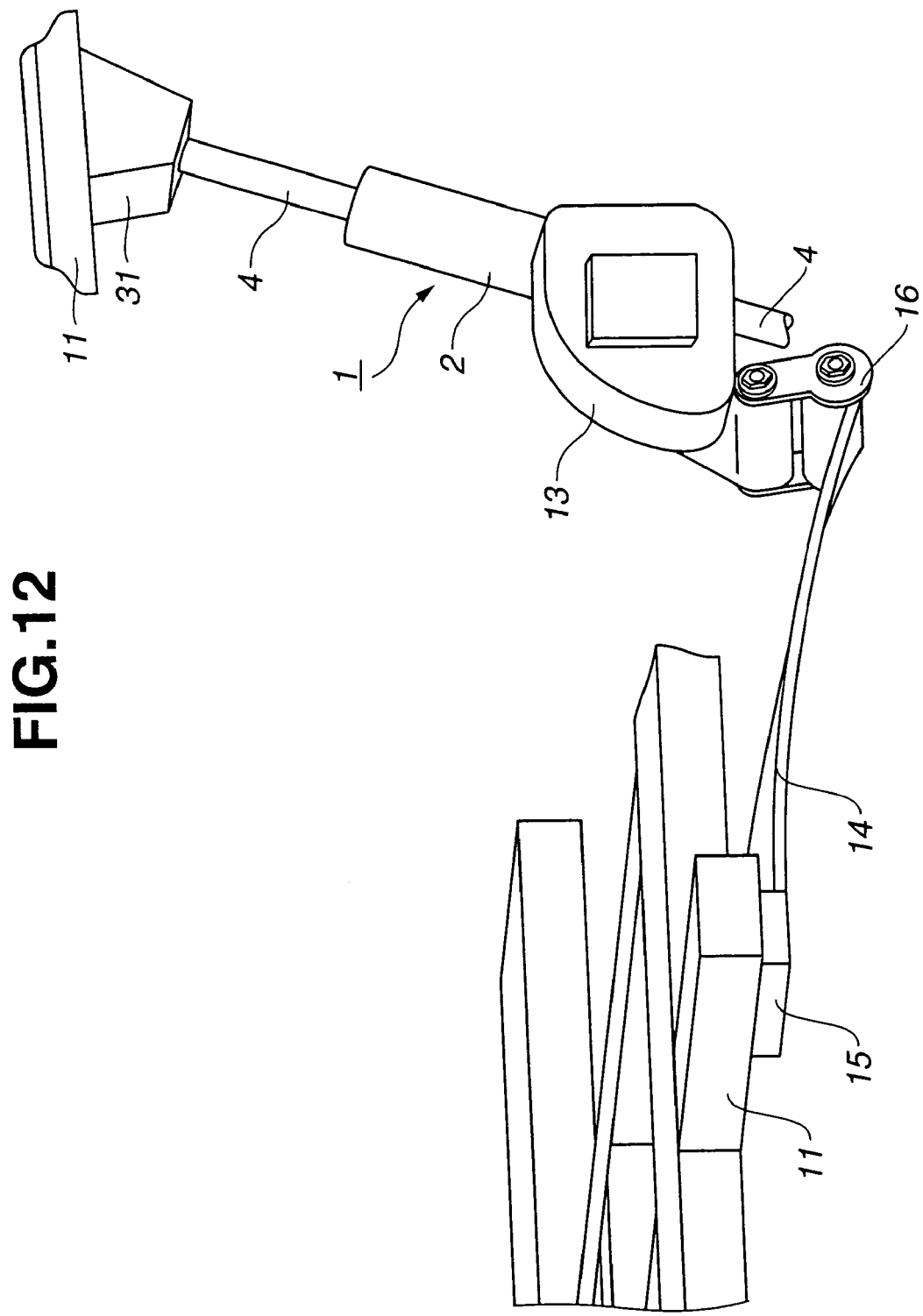
FIG. 12 is a perspective view of a left rear independent suspension system for a wheeled vehicle in accordance with a first embodiment of the present invention, viewed from the left side of the vehicle.
Figure 13:
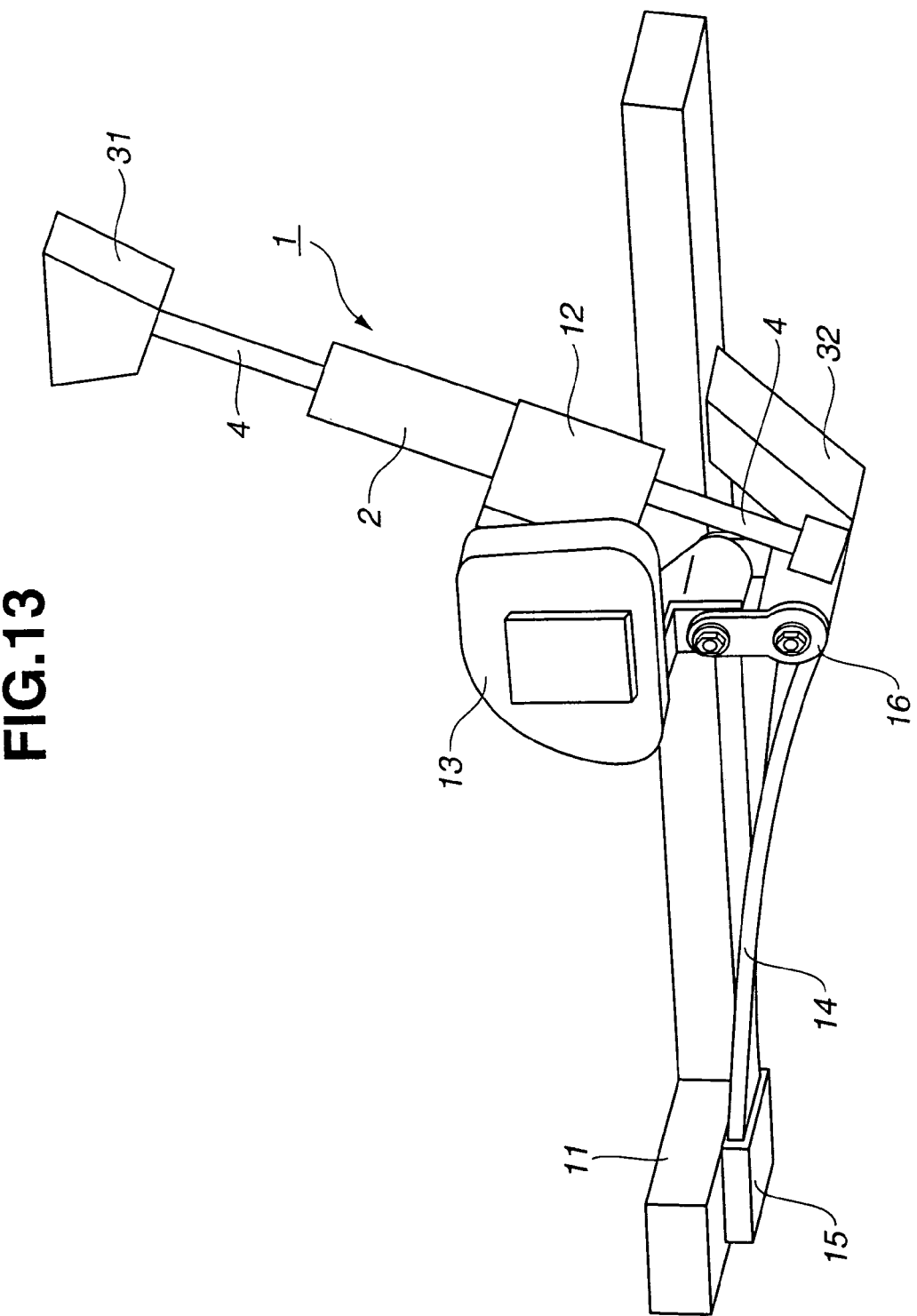
FIG. 13 is another perspective view of the independent suspension system of FIG. 12, viewed from the bottom side of the vehicle.
Figure 14:
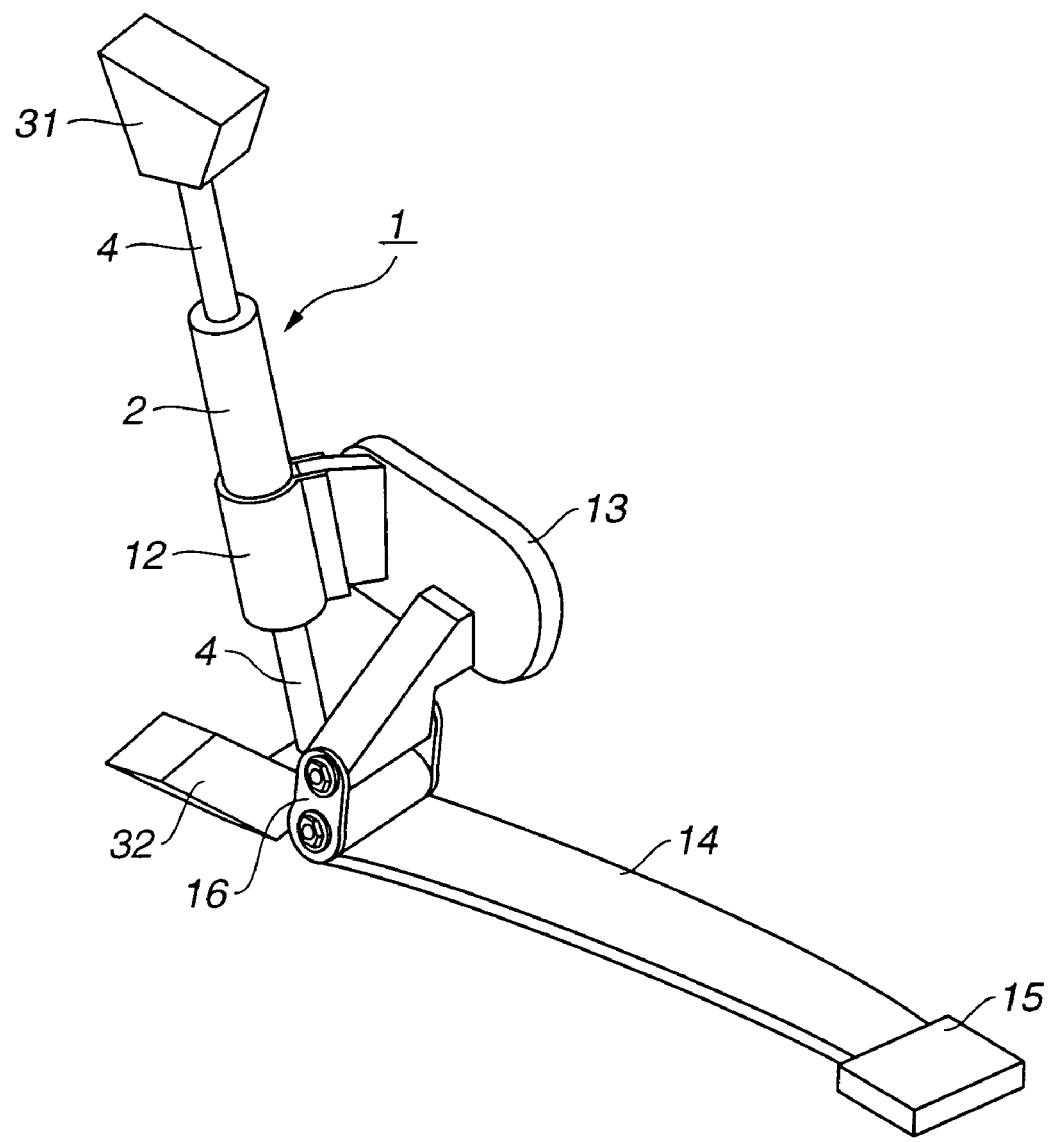
FIG. 14 is still another perspective view of the independent suspension system of FIG. 12, viewed from the inside of the vehicle.

Referring now to FIGS. 12 through 14, there is shown a left rear independent suspension system for a front drive vehicle in accordance with a first embodiment of the present invention. This embodiment is produced by combining the features as shown in FIGS. 1 and 5. FIGS. 12 through 14 show perspective views of the suspension system viewed from three different viewpoints. FIG. 12 is a perspective view of the suspension system, viewed from the left side of the vehicle. FIG. 13 is another perspective view of the suspension system, viewed from the bottom side of the vehicle. FIG. 14 is still another perspective view of the suspension system, viewed from the inside of the vehicle.

Shock absorber 1 as shown in FIG. 2 is mounted extending vertically so that cylinder 2 and rod 4 relatively move in a vertical direction, and is inclined rearward with the top end located behind the bottom end so that the vehicle bears an anti-dive feature to minimize a nose-dive movement in braking. The upper end of rod 4 is coupled to vehicle body 11 via a bracket 31. The lower end of rod 4 is coupled to vehicle body 11 via a bracket 32, as shown in FIGS. 13 and 14. Accordingly, cylinder 2 is supported on rod 4 for linear motion along the longitudinal axis of rod 4 (along the vertical direction of the vehicle). Cylinder 2 is rigidly coupled to wheel carrier 13 via bracket 12. Wheel carrier 13 rotatably supports a left rear wheel (not shown). Thus, the wheel is supported for vertical motion, and is constrained against lateral motion.

Wheel carrier 13 is held against rotation on the longitudinal axis of rod 4 by leaf spring 14 as a trailing member extending between wheel carrier 13 and the mounting portion of vehicle body 11. The front end of leaf spring 14 is rigidly coupled to vehicle body 11 via a bracket 15. The rear end of leaf spring 14 is coupled to wheel carrier 13 via hinge-type shackle 16. Mounted in this manner, leaf spring 14 holds wheel carrier 13 against rotation on a vertical axis of the vehicle or against rotation on an axis of the motion of cylinder 2. Accordingly, leaf spring 14 bears both a function of a suspension spring to produce a restoring force in accordance with a displacement of wheel carrier 13 and a function of a trailing link to hold wheel carrier 13 against rotation on a vertical direction of the vehicle. In addition, leaf spring 14 is elastically twisted around the longitudinal axis to decrease a friction in shock absorber 1. This structure is described below in other embodiments in detail.

The following describes operations and behaviors of and effects produced by the foregoing independent suspension system. As shown in FIG. 1, guided by shock absorber 1, wheel carrier 13 and the associated rear wheel travel along the longitudinal axis of shock absorber 1, in directions α and β. Wheel carrier 13 moves on compression to a position as indicated by imaginary lines, and on rebound to a position as indicated by broken lines, while shock absorber 1 absorbs the up-and-down oscillation of wheel carrier 13. Leaf spring 14 holds wheel carrier 13 against rotation on a vertical axis of the vehicle or on the longitudinal axis of shock absorber 1, to prevent an undue change in the toe angle of the rear wheel. In addition, leaf spring 14 serves as a suspension spring to produce a restoring force imposed on wheel carrier 13 in accordance with a displacement of wheel carrier 13.

While wheel carrier 13 moves up and down on compression or on rebound, as shown in FIG. 11, wheel carrier 13 tends to cause an interference with leaf spring 14, because wheel carrier 13 travels with a motion along the longitudinal direction of the vehicle. However, shackle 16 functions like shackles 17, 18 as shown in FIG. 11, to absorb the displacement of wheel carrier 13 in the longitudinal direction of the vehicle. Thus, the interference between leaf spring 14 and wheel carrier 13 in accordance with the motion of wheel carrier 13 is avoided.

Extending in the vertical direction, shock absorber 1 supports wheel carrier 13 against motion in the lateral direction of the vehicle, so that there is no lateral link member extending inward in the lateral direction of the vehicle and connecting wheel carrier 13 and vehicle body 11. Accordingly, this suspension system needs no additional space under the floor of the vehicle for swinging motion of a lateral link member. Therefore, there is no disadvantage of a projection in the floor of the vehicle to decrease the interior space.

In addition, absence of a movable lateral link member results in a decrease in the number of parts of the suspension system, and thereby in reducing the cost and the weight of the suspension system.

Shock absorber 1 includes one cylinder 2 and one rod 4 as shown in FIG. 2. This structure has an advantage in strength with respect to the structures where the shock absorber includes separate rods as shown in FIGS. 3 and 4.

In the shown embodiment, rod 4 is coupled to vehicle body 11 at both ends, to enhance the rigidity and strength of attachment of shock absorber 1 to vehicle body 11. Alternatively, rod 4 may be coupled to vehicle body 11 at only one end, in case the structure needs no high strength for the attachment. In this case, a normal shock absorber including a rod extending outward through only one end portion of a cylinder may be employed.

Figure 15:
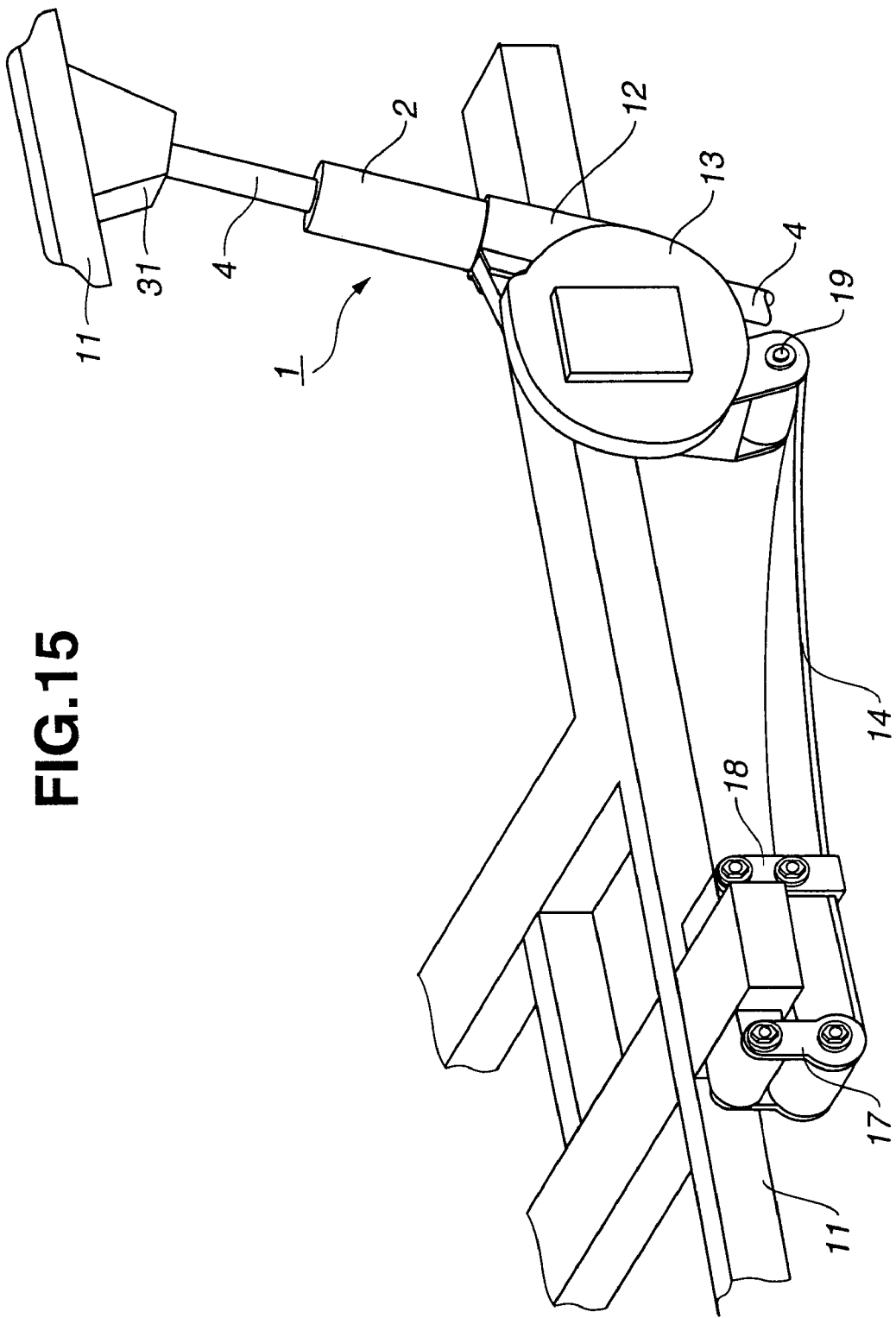
FIG. 15 is a perspective view of a left rear independent suspension system for a wheeled vehicle in accordance with a second embodiment of the present invention, viewed from the left side of the vehicle.
Figure 16:
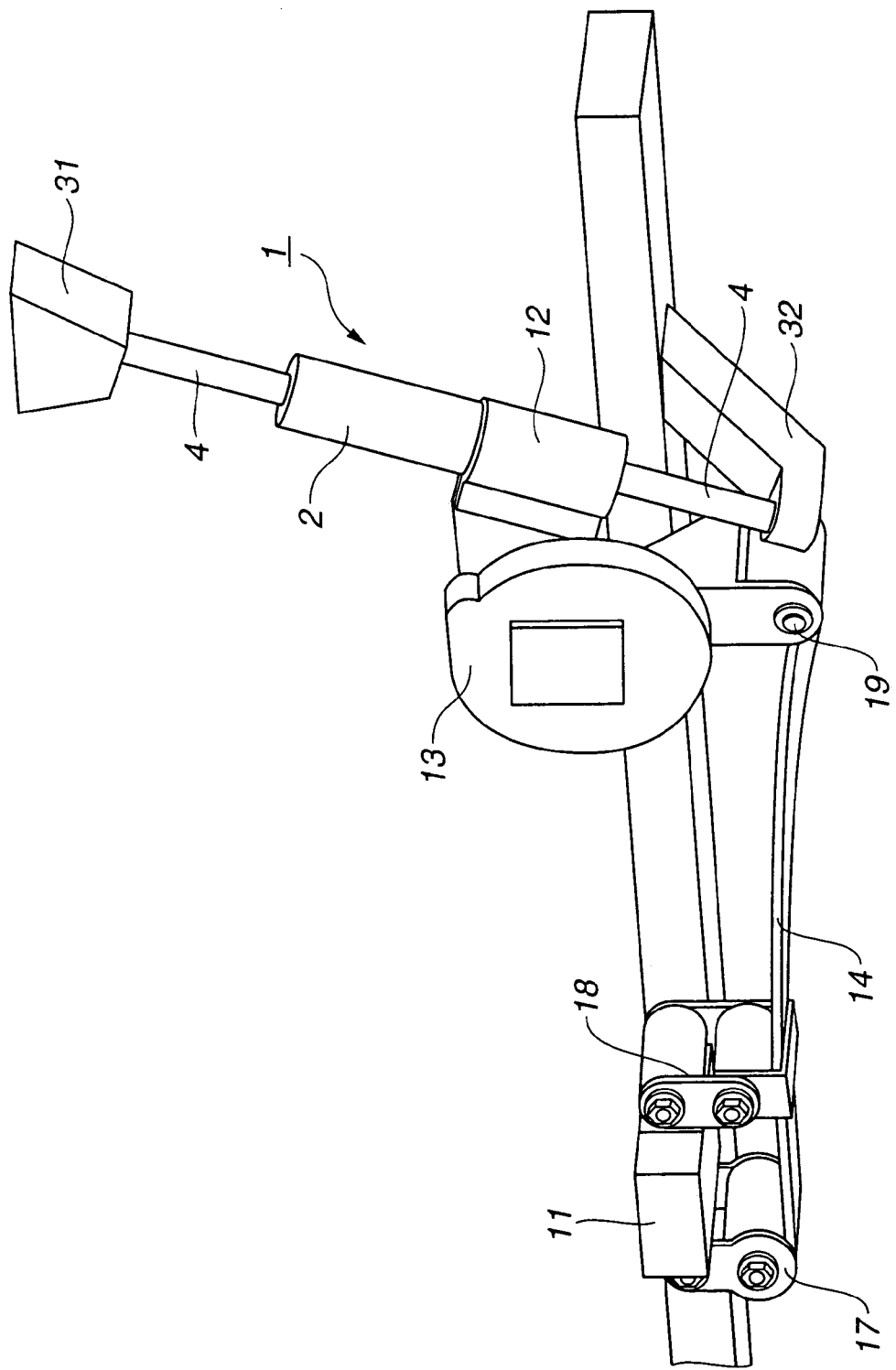
FIG. 16 is another perspective view of the independent suspension system of FIG. 15, viewed from the bottom side of the vehicle.
Figure 17:
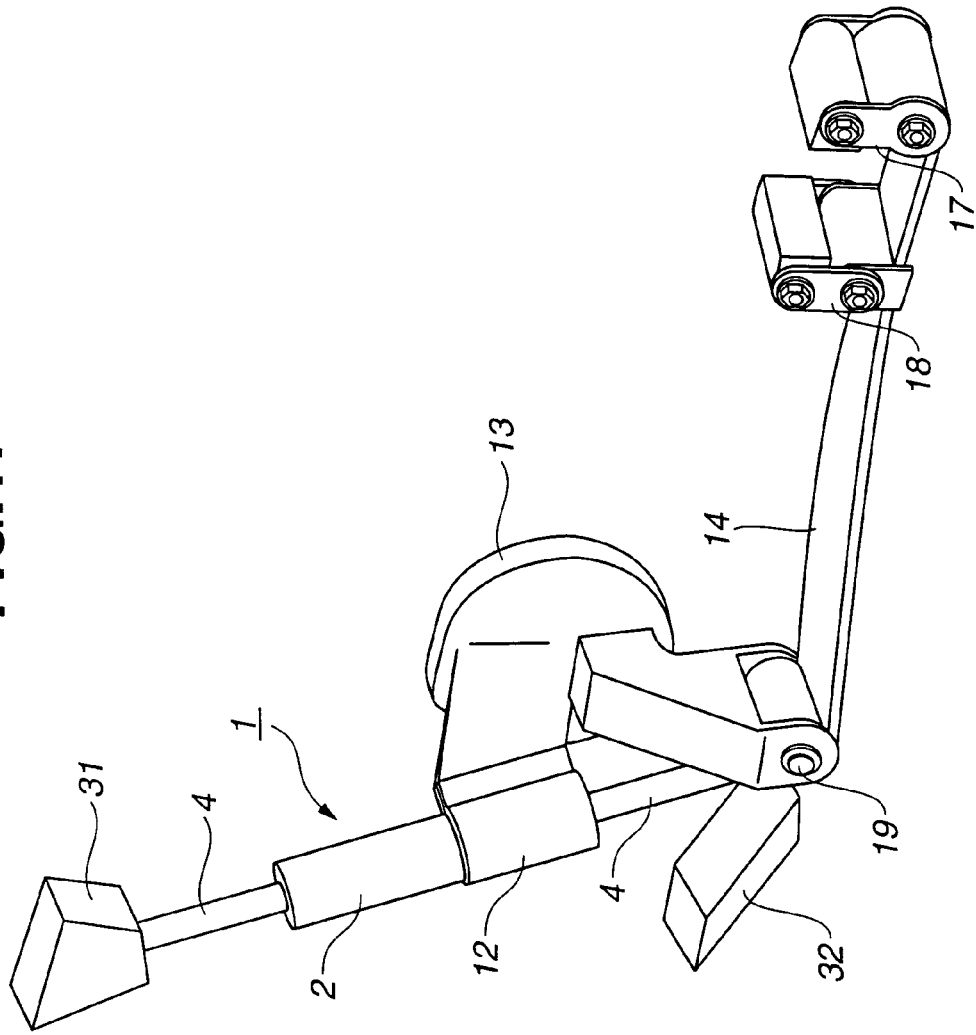
FIG. 17 is still another perspective view of the independent suspension system of FIG. 15, viewed from the inside of the vehicle.

Referring now to FIGS. 15 through 17, there is shown a left rear independent suspension system for a front drive vehicle in accordance with a second embodiment of the present invention. This embodiment is produced by combining the features as shown in FIGS. 1 and 6. FIGS. 15 through 17 show perspective views of the suspension system viewed from three different viewpoints. FIG. 15 is a perspective view of the suspension system, viewed from the left side of the vehicle. FIG. 16 is another perspective view of the suspension system, viewed from the bottom side of the vehicle. FIG. 17 is still another perspective view of the suspension system, viewed from the inside of the vehicle.

Shock absorber 1 as shown in FIG. 2 is mounted extending vertically so that cylinder 2 and rod 4 relatively move in a vertical direction, and is inclined rearward with the top end located behind the bottom end so that the vehicle bears an anti-dive feature to minimize a nose-dive movement in braking. The upper end of rod 4 is coupled to vehicle body 11 via a bracket 31. The lower end of rod 4 is coupled to vehicle body 11 via a bracket 32, as shown in FIGS. 16 and 17. Accordingly, cylinder 2 is supported on rod 4 for linear motion along the longitudinal axis of rod 4 (along the vertical direction of the vehicle). Cylinder 2 is rigidly coupled to wheel carrier 13 via bracket 12. Wheel carrier 13 rotatably supports a left rear wheel (not shown). Thus, the wheel is supported for vertical motion, and is constrained against lateral motion.

Wheel carrier 13 is held against rotation on the longitudinal axis of rod 4 by leaf spring 14 as a trailing member extending between wheel carrier 13 and the mounting portion of vehicle body 11. The front end of leaf spring 14 is coupled to vehicle body 11 via a pair of hinge-type shackles 17 and 18. The rear end of leaf spring 14 is coupled to wheel carrier 13 via pin 19. Mounted in this manner, leaf spring 14 holds wheel carrier 13 against rotation on a vertical axis of the vehicle. Accordingly, leaf spring 14 bears both a function of a suspension spring to produce a restoring force in accordance with a displacement of wheel carrier 13 and a function of a trailing link to hold wheel carrier 13 against rotation on a vertical direction of the vehicle. In addition, leaf spring 14 is elastically twisted around the longitudinal axis to decrease a friction in shock absorber 1. This structure is described below in other embodiments in detail.

In the second embodiment, the independent suspension system bears similar operations and effects as in the first embodiment. The major part of difference between the first and second embodiments is the following. The displacement of wheel carrier 13 in the longitudinal direction of the vehicle on compression or on rebound is absorbed by the swinging motions of shackles 17 and 18 in the directions γ or δ, as above discussed in FIG. 11.

Figure 18:
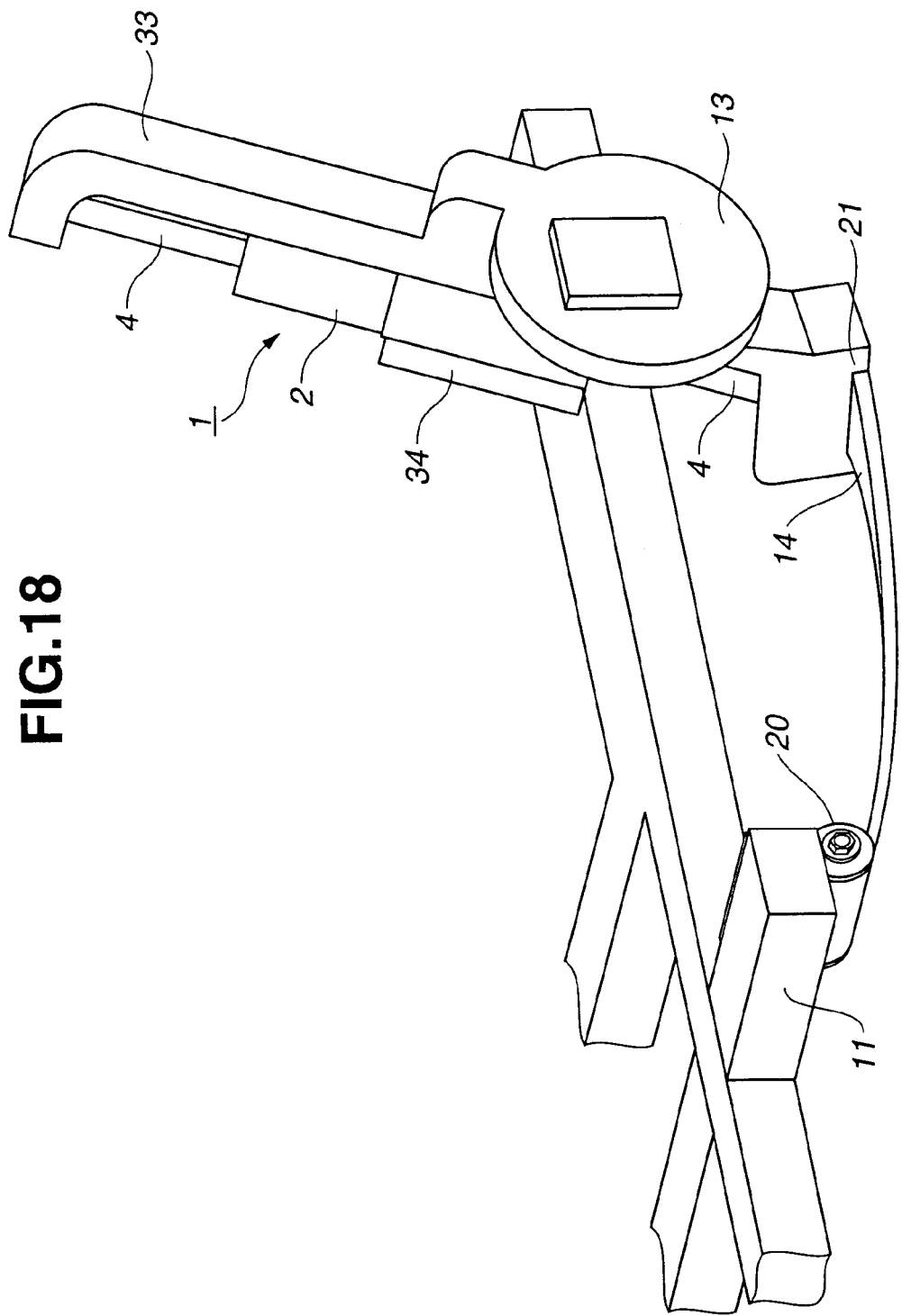
FIG. 18 is a perspective view of a left rear independent suspension system for a wheeled vehicle in accordance with a third embodiment of the present invention, viewed from the left side of the vehicle.
Figure 19:
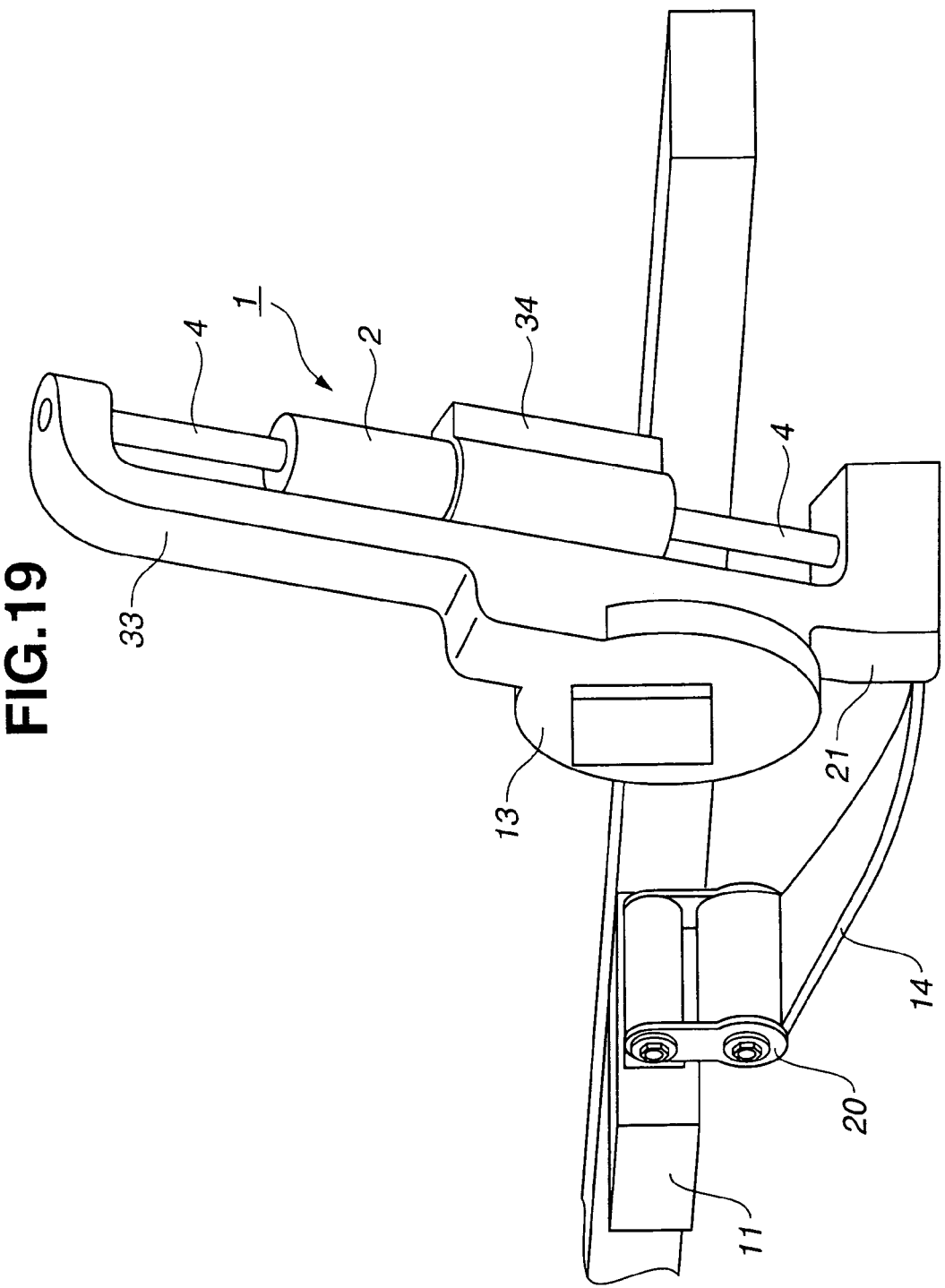
FIG. 19 is another perspective view of the independent suspension system of FIG. 18, viewed from the bottom side of the vehicle.
Figure 20:
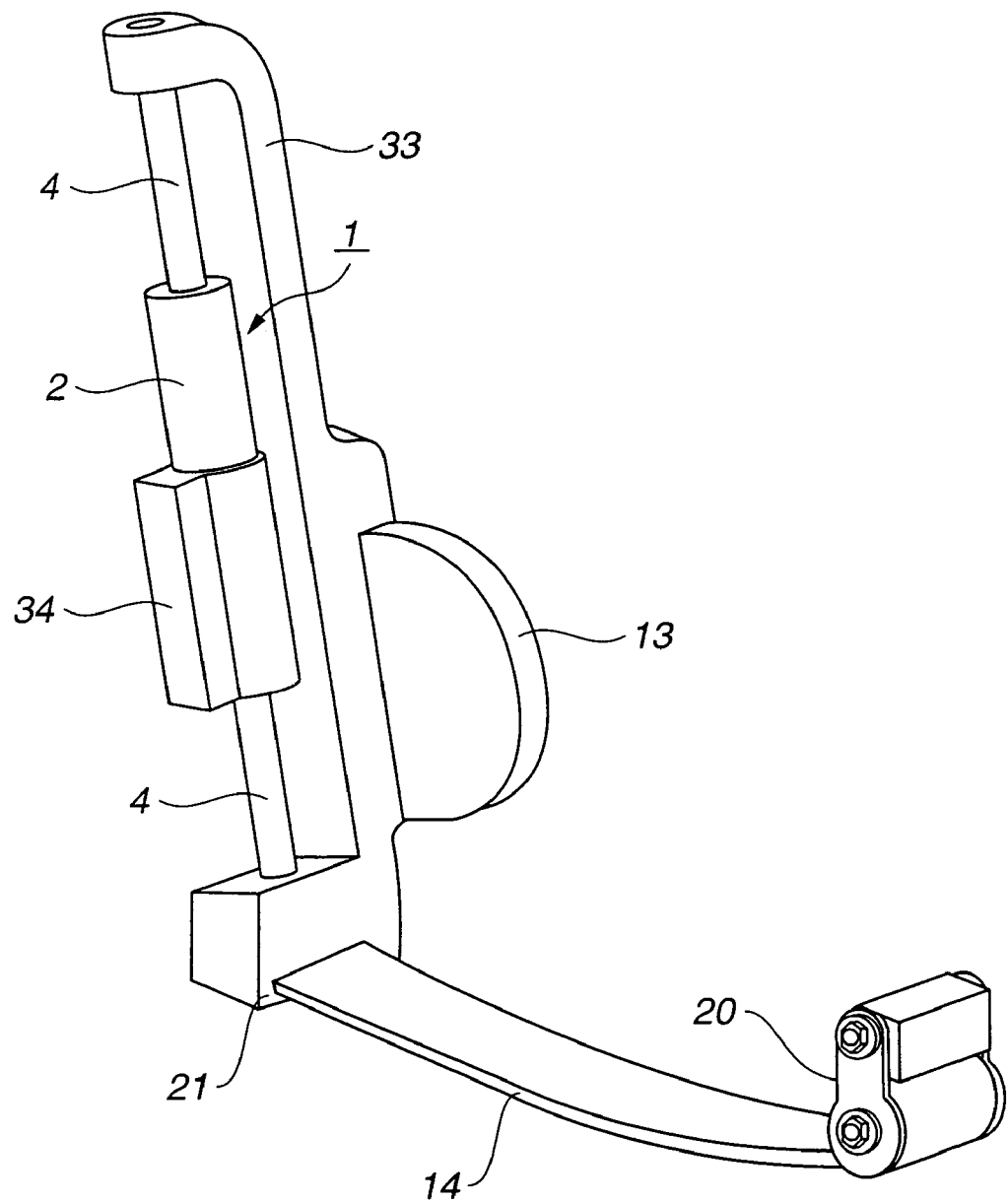
FIG. 20 is still another perspective view of the independent suspension system of FIG. 18, viewed from the inside of the vehicle.

Referring now to FIGS. 18 through 20, there is shown a left rear independent suspension system for a front drive vehicle in accordance with a third embodiment of the present invention. FIGS. 18 through 20 show perspective views of the suspension system viewed from three different viewpoints. FIG. 18 is a perspective view of the suspension system, viewed from the left side of the vehicle. FIG. 19 is another perspective view of the suspension system, viewed from the bottom side of the vehicle. FIG. 20 is still another perspective view of the suspension system, viewed from the inside of the vehicle.

Shock absorber 1 as shown in FIG. 2 is mounted extending vertically so that cylinder 2 and rod 4 relatively move in a vertical direction, and is inclined rearward with the top end located behind the bottom end so that the vehicle bears an anti-dive feature to minimize a nose-dive movement in braking. In this embodiment, the both ends of rod 4 are rigidly coupled to wheel carrier 13 via a bracket 33. Cylinder 2 is rigidly coupled to vehicle body 11 via a bracket 34. Accordingly, rod 4 is supported on cylinder 2 for linear motion along the longitudinal axis of rod 4 (along the vertical direction of the vehicle). Wheel carrier 13 rotatably supports a left rear wheel (not shown). Thus, the wheel is supported for vertical motion, and is constrained against lateral motion.

Wheel carrier 13 is held against rotation on the longitudinal axis of rod 4 by leaf spring 14 as a trailing member extending between wheel carrier 13 and the mounting portion of vehicle body 11. The front end of leaf spring 14 is rigidly coupled to vehicle body 11 via hinge-type shackle 20. The rear end of leaf spring 14 is rigidly coupled to the lower portion of wheel carrier 13 via bracket 21. Mounted in this manner, leaf spring 14 holds wheel carrier 13 against rotation on a vertical axis of the vehicle. Accordingly, leaf spring 14 bears both a function of a suspension spring to produce a restoring force in accordance with a displacement of wheel carrier 13 and a function of a trailing link to hold wheel carrier 13 against rotation on a vertical direction of the vehicle. In addition, leaf spring 14 is elastically twisted around the longitudinal axis to decrease a friction in shock absorber 1. This structure is described below in other embodiments in detail.

The following describes operations and behaviors of and effects produced by the foregoing independent suspension system. As shown in FIG. 1, guided by shock absorber 1, wheel carrier 13 and the associated rear wheel travel along the longitudinal axis of shock absorber 1, in directions α and β. Wheel carrier 13 moves on compression to a position as indicated by imaginary lines, and on rebound to a position as indicated by broken lines, while shock absorber 1 absorbs the up-and-down oscillation of wheel carrier 13. Leaf spring 14 holds wheel carrier 13 against rotation on a vertical axis of the vehicle or on the longitudinal axis of shock absorber 1, to prevent an undue change in the toe angle of the rear wheel. In addition, leaf spring 14 serves as a suspension spring to produce a restoring force imposed on wheel carrier 13 in accordance with a displacement of wheel carrier 13.

While wheel carrier 13 moves up and down on compression or on rebound, as shown in FIG. 11, wheel carrier 13 tends to cause an interference with leaf spring 14, because wheel carrier 13 travels with a motion along the longitudinal direction of the vehicle. However, shackle 20 functions like shackles 17, 18 as shown in FIG. 11, to absorb the displacement of wheel carrier 13 in the longitudinal direction of the vehicle. Thus, the interference between leaf spring 14 and wheel carrier 13 in accordance with the motion of wheel carrier 13 is avoided.

Extending in the vertical direction, shock absorber 1 supports wheel carrier 13 against motion in the lateral direction of the vehicle, so that there is no lateral link member extending inward in the lateral direction of the vehicle and connecting wheel carrier 13 and vehicle body 11. Accordingly, this suspension system needs no additional space under the floor of the vehicle for swinging motion of a lateral link member. Therefore, there is no disadvantage of a projection in the floor of the vehicle to decrease the interior space.

In addition, absence of a movable lateral link member results in a decrease in the number of parts of the suspension system, and thereby in reducing the cost and the weight of the suspension system.

Shock absorber 1 includes one cylinder 2 and one rod 4 as shown in FIG. 2. This structure has an advantage in strength with respect to the structures where the shock absorber includes separate rods as shown in FIGS. 3 and 4.

In the shown embodiment, rod 4 is coupled to vehicle body 11 at both ends, to enhance the rigidity and strength of attachment of shock absorber 1 to vehicle body 11. Alternatively, rod 4 may be coupled to vehicle body 11 at only one end, in case the structure needs no high strength for the attachment. In this case, a normal shock absorber including a rod extending outward through only one end portion of a cylinder may be employed.

In the three embodiments discussed above, leaf spring 14 is employed as a trailing member to support wheel carrier 13 against rotation on the vertical axis of the vehicle. Leaf spring 14 also serves as a suspension spring, so that the suspension system needs no additional suspension spring. This leads to advantages in cost reduction and weight reduction.

In the three embodiments discussed above, shock absorber 1 is employed as a support member to support or guide wheel carrier 13 for motion in a vertical direction of the vehicle. The suspension system needs no additional space for a support member for wheel carrier 13 other than space for shock absorber 1. This results in reducing space for whole suspension system. This also leads to advantages in cost reduction and weight reduction.

Figure 21:
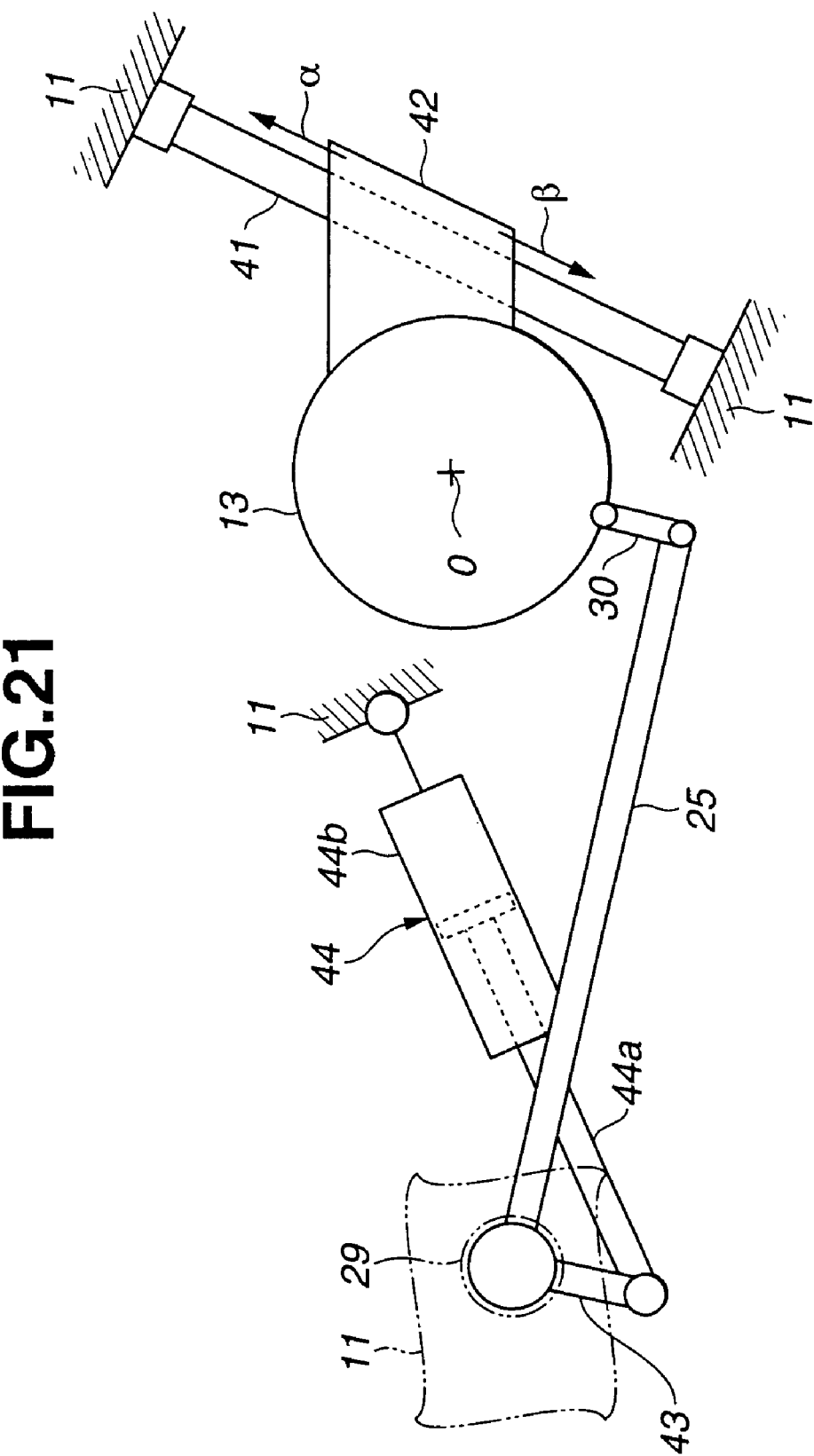
FIG. 21 is a schematic diagram showing a left rear independent suspension system for a wheeled vehicle in accordance with a fourth embodiment of the present invention, viewed from the left side of the vehicle.

However, the function of guiding wheel carrier 13 and the function of absorbing shocks may be allocated to separate elements, as follows. Referring now to FIG. 21, there is shown a left rear independent suspension system for a front drive vehicle in accordance with a fourth embodiment of the present invention. Shock absorber 1 as a guide member is replaced by a combination of a guide rod 41 and a slide member 42. Guide rod 41 is mounted extending vertically so that guide rod 41 and slide member 42 relatively move in a vertical direction, and is inclined rearward with the top end located behind the bottom end so that the vehicle bears an anti-dive feature to minimize a nose-dive movement in braking. The both ends of guide rod 41 are rigidly coupled to vehicle body 11. Alternatively, only one of the ends of rod 41 may be coupled to vehicle body 11, in case the suspension system needs no high strength of attachment of rod 41. Accordingly, slide member 42 is supported on guide rod 41 for linear motion along the longitudinal axis of guide rod 41 (along the vertical direction). Slide member 42 is rigidly coupled to wheel carrier 13. Wheel carrier 13 rotatably supports a left rear wheel (not shown). Thus, the wheel is supported for vertical motion, and is constrained against lateral motion.

Wheel carrier 13 is held against rotation on the longitudinal axis of guide rod 41 by a trailing link 25 as a trailing member extending between wheel carrier 13 and the mounting portion of vehicle body 11. The front end of link 25 is rigidly coupled to vehicle body 11 via a torsion bar 29 extending in the lateral direction of the vehicle. The rear end of link 25 is coupled to wheel carrier 13 via hinge-type shackle 30. The inner end of torsion bar 29 is connected to a rod 44a of a shock absorber 44 via an arm 43. A midpoint of torsion bar 29 is rotatably supported on vehicle body 11. Shock absorber 44 is of the normal type, which a rod is extending out of only one end portion of a cylinder. Cylinder 44b is coupled to vehicle body 11.

The following describes operations and behaviors of and effects produced by the foregoing independent suspension system. As shown in FIG. 21, guided by guide rod 41 via slide member 42, wheel carrier 13 and the associated rear wheel travel along the longitudinal axis of guide rod 41. Wheel carrier 13 moves in a direction α on compression, and in a direction β on rebound. Link 25 holds wheel carrier 13 against rotation on a vertical axis of the vehicle or on the longitudinal axis of guide rod 41, to prevent an undue change in the toe angle of the rear wheel. In addition, on compression or rebound, link 25 rotates on the longitudinal axis of torsion bar 29 to twist torsion bar 29 and thereby to stroke shock absorber 44. Shock absorber 44 absorbs the up-and-down oscillation of wheel carrier 13. Torsion bar 29 serves as a suspension spring to produce a restoring force in accordance with a twist amount of torsion bar 29.

While wheel carrier 13 moves up and down on compression or on rebound, as shown in FIG. 11, wheel carrier 13 tends to cause an interference with link 25, because wheel carrier 13 travels with a motion along the longitudinal direction of the vehicle. However, shackle 30 functions like shackles 17, 18 as shown in FIG. 11, to absorb the displacement of wheel carrier 13 in the longitudinal direction of the vehicle. Thus, the interference between link 25 and wheel carrier 13 in accordance with the motion of wheel carrier 13 is avoided.

Extending in the vertical direction, the combination of guide rod 41 and slide member 42 supports wheel carrier 13 against motion in the lateral direction of the vehicle, so that there is no movable lateral link member extending inward in the lateral direction of the vehicle and connecting wheel carrier 13 and vehicle body 11. Accordingly, this suspension system needs no additional space under the floor of the vehicle for swinging motion of a lateral link member. Therefore, there is no disadvantage of a projection in the floor of the vehicle to decrease the interior space.

In addition, absence of a movable lateral link member results in a decrease in the number of parts of the suspension system, and thereby in reducing the cost and the weight of the suspension system.

In this embodiment, slide member 42 has a smaller outside diameter than shock absorber 1 in the other preceding embodiments in which shock absorber 1 serves for the function of guiding wheel carrier 13 and the function of absorbing shocks. Therefore, the combination of guide rod 41 and slide member 42 is easily mounted in a limited space near wheel carrier 13. In addition, the strength of guide rod 41 is easily enhanced by adjusting its dimensions.

Torsion bar 29 bears a function of transmitting the vertical motion of wheel carrier 13 to shock absorber 44, and also a function as a suspension spring. This results in a decrease in the number of parts of the suspension system, and thereby in reducing the cost and the weight of the suspension system. Link 25 as a suspension spring may be replaced by leaf spring 14. In that case, torsion bar 29 also may be replaced by a lateral rod with no function of a spring.

In the fourth embodiment, shock absorber 44 is of the type which employs hydraulic fluid, as shown in FIG. 21. Alternatively, shock absorber 44 may be of another type such as an electrical type which employs an electrical load to dampen an oscillation.

The following describes the structure of the leaf spring as a lateral member employed in the suspension system, focusing on the features of twisting the leaf spring.

Figure 22:
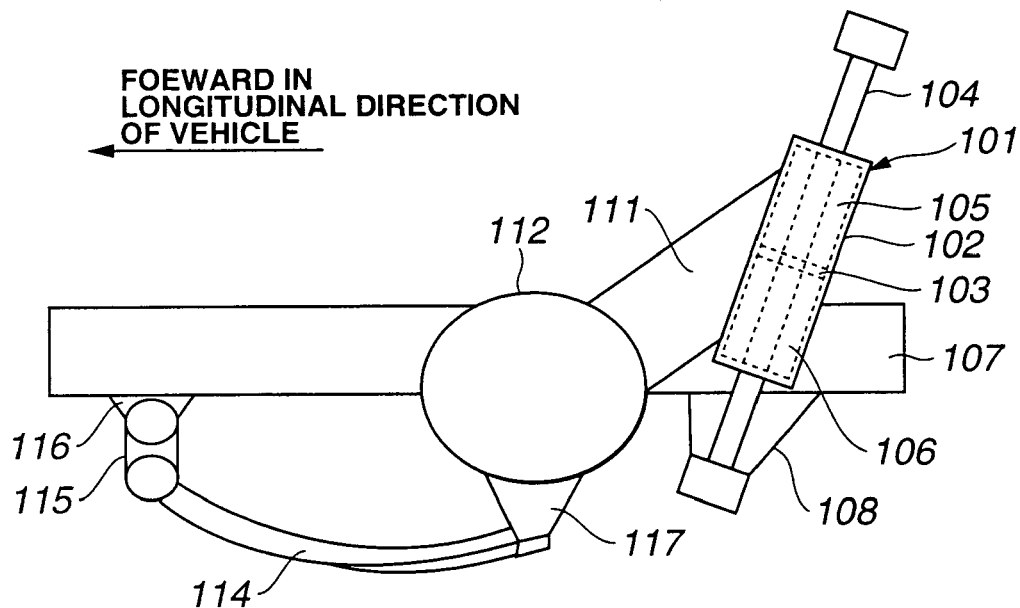
FIG. 22 is a schematic diagram showing a left rear independent suspension system for a wheeled vehicle in accordance with a fifth embodiment of the present invention, viewed from the left side of the vehicle.
Figure 23:
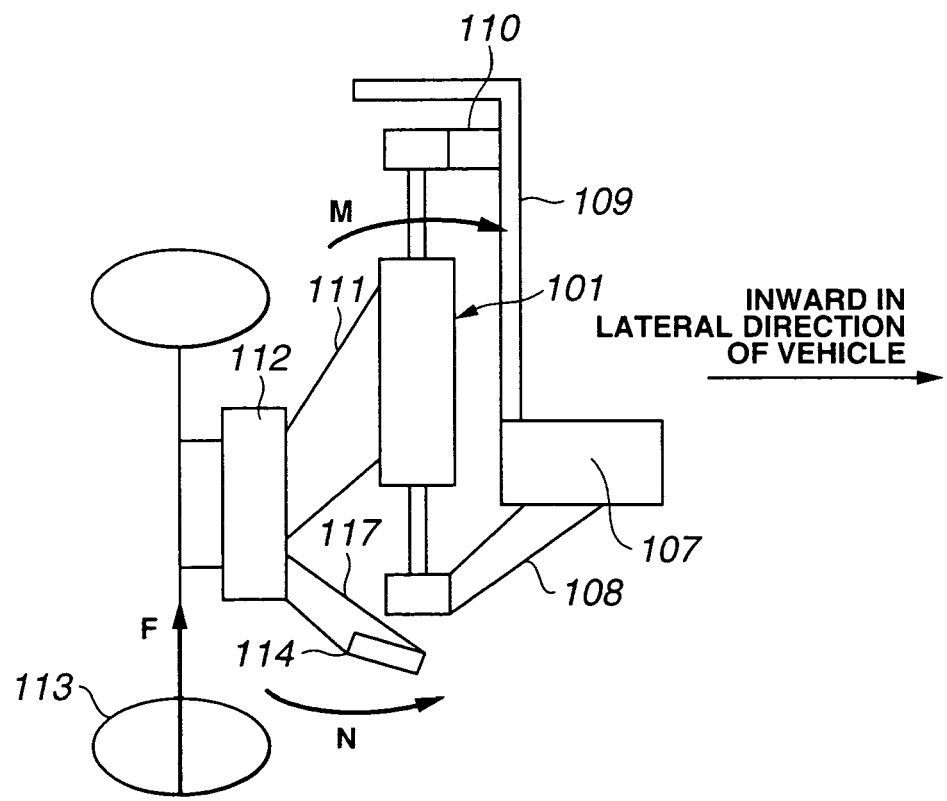
FIG. 23 is a schematic diagram showing the independent suspension system of FIG. 22, viewed from the rear side of the vehicle.
Figure 24:
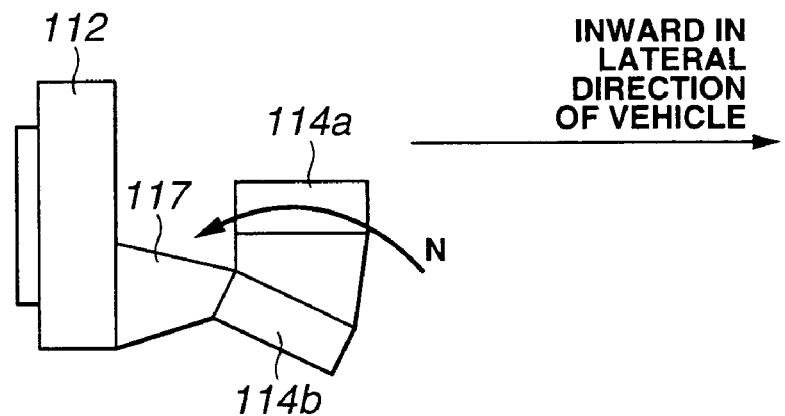
FIG. 24 is a schematic diagram showing a part of the independent suspension system of FIG. 22, viewed from the rear side of the vehicle.

Referring now to FIGS. 22 through 24, there is shown a left rear independent suspension system for a front drive vehicle in accordance with a fifth embodiment of the present invention. FIG. 22 is a schematic diagram showing the independent suspension system, viewed from the left side of the vehicle. FIG. 23 is a schematic diagram showing the independent suspension system, viewed from the rear side of the vehicle. FIG. 24 is a schematic diagram showing a part of the independent suspension system, viewed from the rear side of the vehicle.

Shock absorber 101 as shown in FIG. 2 is mounted extending vertically so that cylinder 102 and rod 104 relatively move in a vertical direction, and is inclined rearward with the top end located behind the bottom end so that the vehicle bears an anti-dive feature to minimize a nose-dive movement in braking. The upper end of rod 104 is coupled to a side member 107 of the vehicle body via a bracket 110, as shown in FIG. 23. The lower end of rod 104 is coupled to side member 107 via a bracket 108. Accordingly, cylinder 102 is supported on rod 104 for linear motion along the longitudinal axis of rod 104 (along the vertical direction of the vehicle). Cylinder 102 is rigidly coupled to wheel carrier 112 via bracket 111. Wheel carrier 112 rotatably supports a left rear wheel (not shown). Thus, the wheel is supported for vertical motion, and is constrained against lateral motion.

Wheel carrier 112 is held against rotation on the longitudinal axis of rod 104 by leaf spring 114 as a connection member extending between wheel carrier 112 and the mounting portion of side member 107. The front end of leaf spring 114 is rigidly coupled to side member 107 via a hinge-type shackle 115 and a bracket 116. The rear end of leaf spring 114 is rigidly coupled to wheel carrier 112 via a bracket 117. Mounted in this manner, leaf spring 114 holds wheel carrier 112 against rotation on a vertical axis of the vehicle. Accordingly, leaf spring 114 bears both a function of a suspension spring to produce a restoring force in accordance with a displacement of wheel carrier 112 and a function of a trailing link to hold wheel carrier 112 against rotation on a vertical direction of the vehicle.

As shown in FIG. 23, an input F as a normal force is imposed on a contact surface of wheel 113 by the ground, to produce a moment M imposed on shock absorber 101. Moment M causes a friction within shock absorber 101. Leaf spring 114 is elastically twisted to cancel moment M. More specifically, from a rear viewpoint, as shown in FIG. 23, leaf spring 114 is elastically twisted clockwise from front to rear to produce a moment N to cancel moment M. For example, moment N may be determined in accordance with moment M in a condition where the suspension system is at rest with the vehicle at normal loaded height. As shown in FIG. 24, the front end 114a of leaf spring 114 is mounted in a horizontal position, while the rear end 114b of leaf spring 114 is inclined clockwise. In other words, leaf spring 114 is elastically twisted to bias wheel carrier 112 in a direction to positively increase a camber angle of wheel carrier 112.

Mounted as discussed above, leaf spring 114 produces moment N to cancel moment M, and thereby to decrease frictions between cylinder 102 and piston 103 and between cylinder 102 and rod 104. Leaf spring 114 serves for supporting wheel carrier 112 and also for decreasing a friction within shock absorber 101 to enhance comfortability and driving stability of the vehicle. Therefore, the suspension system needs no additional elastic element to decrease the friction. This makes the suspension system compact, so as to provide a large interior space.

Figure 25:
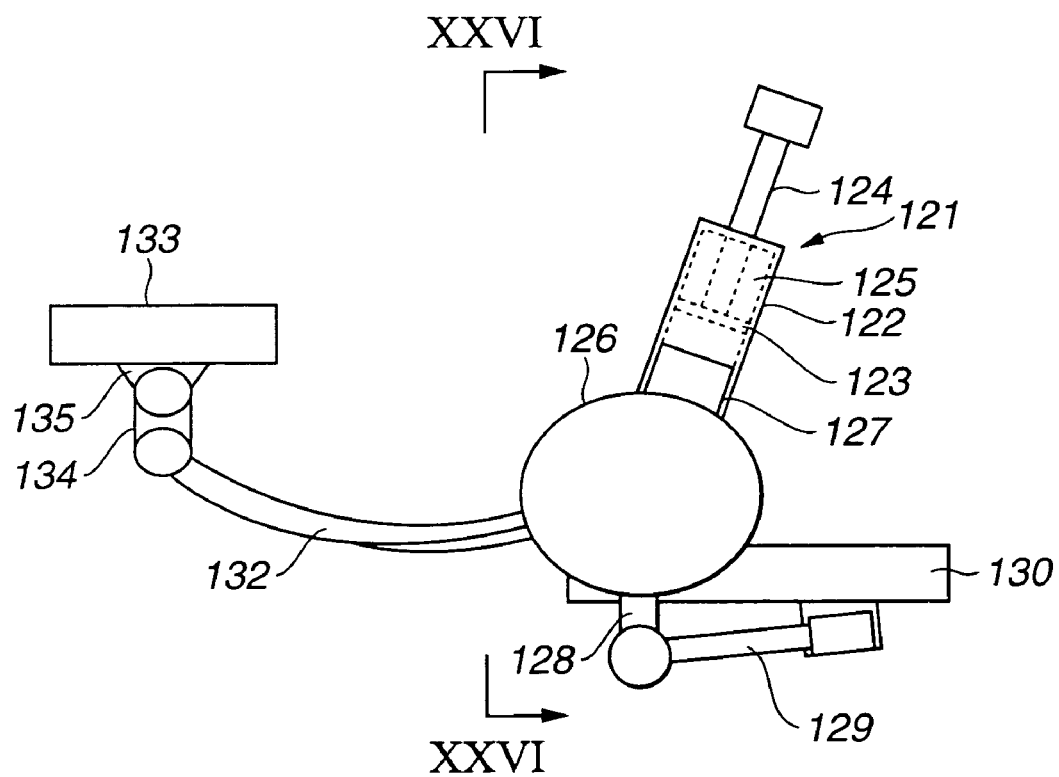
FIG. 25 is a schematic diagram showing a left rear independent suspension system for a wheeled vehicle in accordance with a sixth embodiment of the present invention, viewed from the left side of the vehicle.
Figure 26:
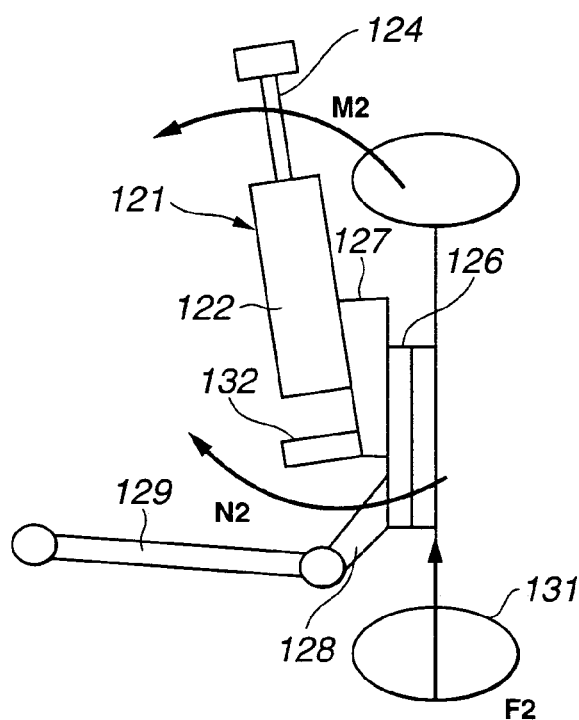
FIG. 26 is a sectional view taken along the plane indicated by the line XXVI-XXVI in FIG. 25.

Referring now to FIGS. 25 through 26, there is shown a left rear independent suspension system for a front drive vehicle in accordance with a sixth embodiment of the present invention. FIG. 25 is a schematic diagram showing the independent suspension system, viewed from the left side of the vehicle. FIG. 26 is a sectional view taken along the plane indicated by the line XXVI-XXVI in FIG. 25.

Shock absorber 121 as shown in FIG. 2 is mounted extending vertically so that cylinder 122 and rod 124 relatively move in a vertical direction, and is inclined rearward with the top end located behind the bottom end so that the vehicle bears an anti-dive feature to minimize a nose-dive movement in braking. The upper end of rod 124 is coupled to a side member (not shown) of the vehicle body via a bush (not shown). The lower end of cylinder 122 is coupled to a wheel carrier 126 via a bracket 127. Accordingly, cylinder 102 is supported on rod 124 for linear motion along the longitudinal axis of rod 124 (along the vertical direction of the vehicle). Wheel carrier 126 rotatably supports a left rear wheel (not shown). Thus, the wheel is supported for vertical motion, and is constrained against lateral motion.

Wheel carrier 126 is held against rotation on the longitudinal axis of rod 124 by leaf spring 132 as a trailing member extending between wheel carrier 126 and the mounting portion of the side member. The front end of leaf spring 132 is rigidly coupled to the side member via a hinge-type shackle 134 and a bracket 135. The rear end of leaf spring 132 is rigidly coupled to wheel carrier 126 via a bracket 127. Mounted in this manner, leaf spring 132 holds wheel carrier 126 against rotation on a vertical axis of the vehicle. The lower end of wheel carrier 126 is connected to a suspension member 130 of the vehicle body via bracket 128 and a lower arm 129. Accordingly, leaf spring 132 bears both a function of a suspension spring to produce a restoring force in accordance with a displacement of wheel carrier 126 and a function of a trailing link to hold wheel carrier 126 against rotation on a vertical direction of the vehicle.

As shown in FIG. 26, an input F2 as a normal force is imposed on a contact surface of wheel 131 by the ground, to produce a moment M2 imposed on shock absorber 121. Moment M2 causes a friction within shock absorber 121. Leaf spring 132 is elastically twisted to cancel moment M2. More specifically, from a front viewpoint, as shown in FIG. 26, leaf spring 132 is elastically twisted counterclockwise from front to rear to produce a moment N2 to cancel moment M2. The front end of leaf spring 132 is mounted in a horizontal position, while the rear end of leaf spring 132 is inclined counterclockwise.

Mounted as discussed above, leaf spring 132 produces moment N2 to cancel moment M2, and thereby to decrease frictions between cylinder 122 and piston 123 and between cylinder 122 and rod 124. Leaf spring 132 serves for supporting wheel carrier 126 and also for decreasing a friction within shock absorber 121 enhance comfortability and driving stability of the vehicle. Therefore, the suspension system needs no additional elastic element to decrease the friction. This makes the suspension system compact, so as to provide a large interior space.

Figure 27:
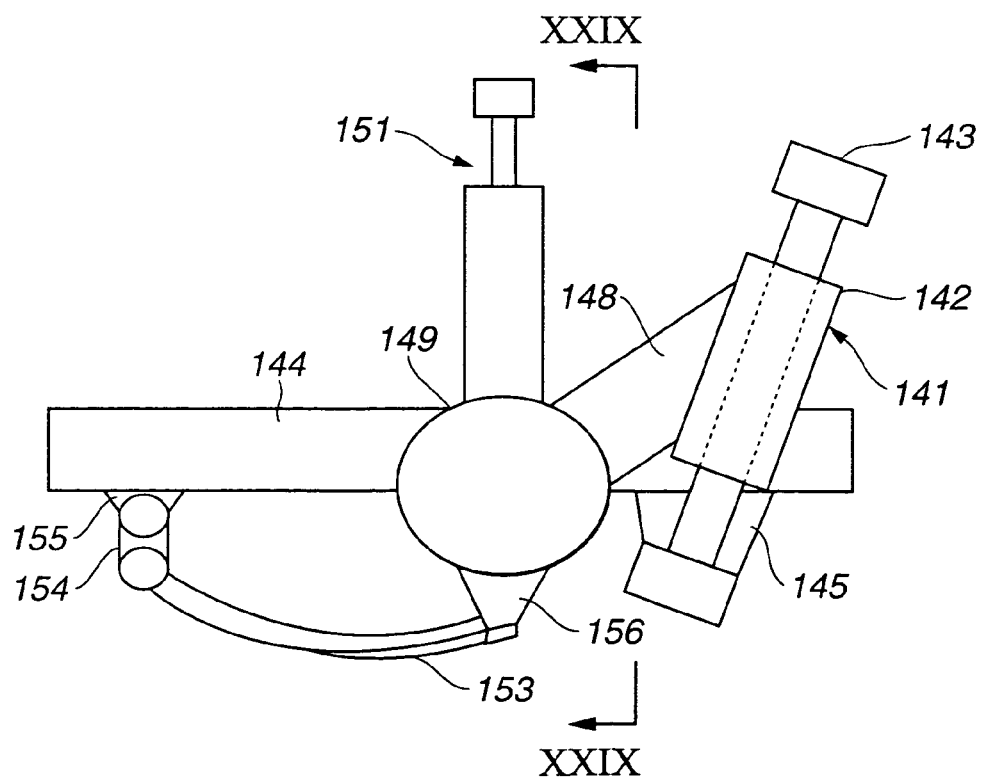
FIG. 27 is a schematic diagram showing a left rear independent suspension system for a wheeled vehicle in accordance with a seventh embodiment of the present invention, viewed from the left side of the vehicle.
Figure 28:
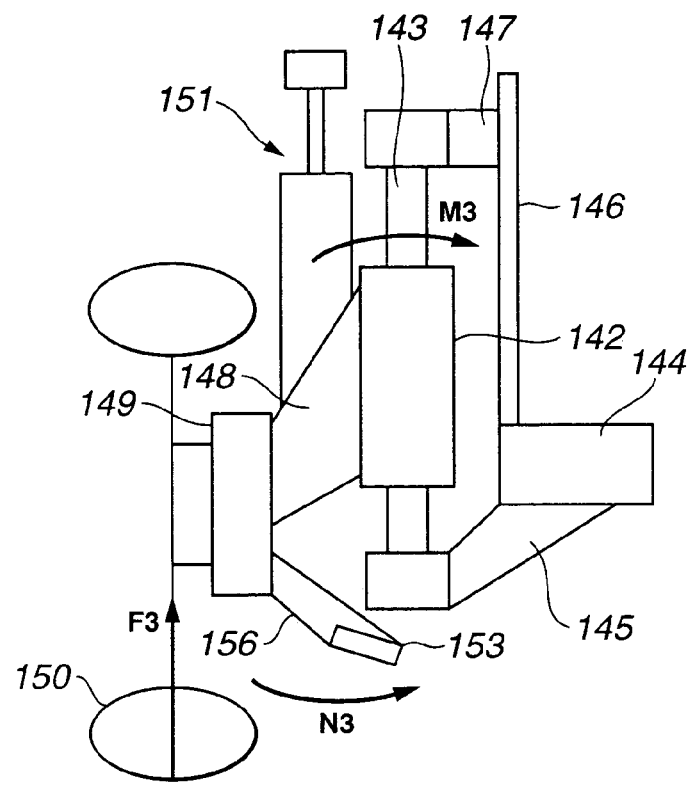
FIG. 28 is a schematic diagram showing the independent suspension system of FIG. 27, viewed from the rear side of the vehicle.
Figure 29:
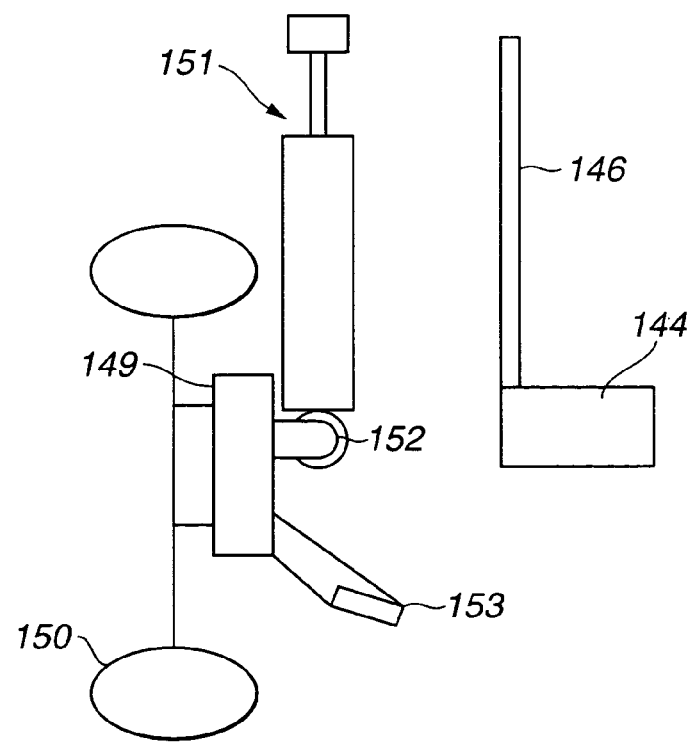
FIG. 29 is a sectional view taken along the plane indicated by the line XXIX-XXIX in FIG. 27.

Referring now to FIGS. 27 through 29, there is shown a left rear independent suspension system for a front drive vehicle in accordance with a seventh embodiment of the present invention. FIG. 27 is a schematic diagram showing the independent suspension system, viewed from the left side of the vehicle. FIG. 28 is a schematic diagram showing the independent suspension system, viewed from the rear side of the vehicle. FIG. 29 is a sectional view taken along the plane indicated by the line XXIX-XXIX in FIG. 27.

Guide member 141 includes a cylinder 142 and a rod 143 slidably supported on cylinder 142. Guide member 141 is mounted extending vertically so that cylinder 142 and rod 143 relatively move in a vertical direction, and is inclined rearward with the top end located behind the bottom end so that the vehicle bears an anti-dive feature to minimize a nose-dive movement in braking. The upper end of rod 143 is coupled to a side member 144 of the vehicle body via a bracket 147 and an inner fender 146, as shown in FIG. 28. The lower end of rod 143 is coupled to side member 144 via a bracket 145. Accordingly, cylinder 142 is supported on rod 143 for linear motion along the longitudinal axis of rod 143 (along the vertical direction of the vehicle). Cylinder 142 is rigidly coupled to wheel carrier 149 via a bracket 148. Wheel carrier 149 rotatably supports a left rear wheel (not shown). Thus, the wheel is supported for vertical motion, and is constrained against lateral motion.

Wheel carrier 149 is held against rotation on the longitudinal axis of rod 143 by a leaf spring 153 as a trailing member extending between wheel carrier 149 and the mounting portion of side member 144. The front end of leaf spring 153 is rigidly coupled to side member 144 via a hinge-type shackle 154 and a bracket 155. The rear end of leaf spring 153 is rigidly coupled to wheel carrier 149 via a bracket 156. Mounted in this manner, leaf spring 153 holds wheel carrier 149 against rotation on a vertical axis of the vehicle. Accordingly, leaf spring 153 bears both a function of a suspension spring to produce a restoring force in accordance with a displacement of wheel carrier 149 and a function of a trailing link to hold wheel carrier 149 against rotation on a vertical direction of the vehicle.

As shown in FIG. 29, a shock absorber 151 is mounted vertically, since guide member 141 has no function of a shock absorber. The cylinder of shock absorber 151 is coupled to wheel carrier 149 via a bracket 152. The rod of shock absorber 151 is coupled to the vehicle body (not shown).

As shown in FIG. 28, an input F3 as a normal force is imposed on a contact surface of wheel 150 by the ground, to produce a moment M3 imposed on guide member 141. Moment M3 causes a friction within guide member 141. Leaf spring 153 is elastically twisted to cancel moment M3. More specifically, from a rear viewpoint, as shown in FIG. 28, leaf spring 153 is elastically twisted clockwise from front to rear to produce a moment N3 to cancel moment M3. The front end of leaf spring 153 is mounted in a horizontal position, while the rear end of leaf spring 153 is inclined clockwise.

Mounted as discussed above, leaf spring 153 produces moment N3 to cancel moment M3, and thereby to decrease frictions between cylinder 142 and rod 143. Leaf spring 153 serves for supporting wheel carrier 149 and also for decreasing a friction within guide member 141 to enhance comfortability and driving stability of the vehicle. Therefore, the suspension system needs no additional elastic element to decrease the friction. This makes the suspension system compact, so as to provide a large interior space.

Figure 30:
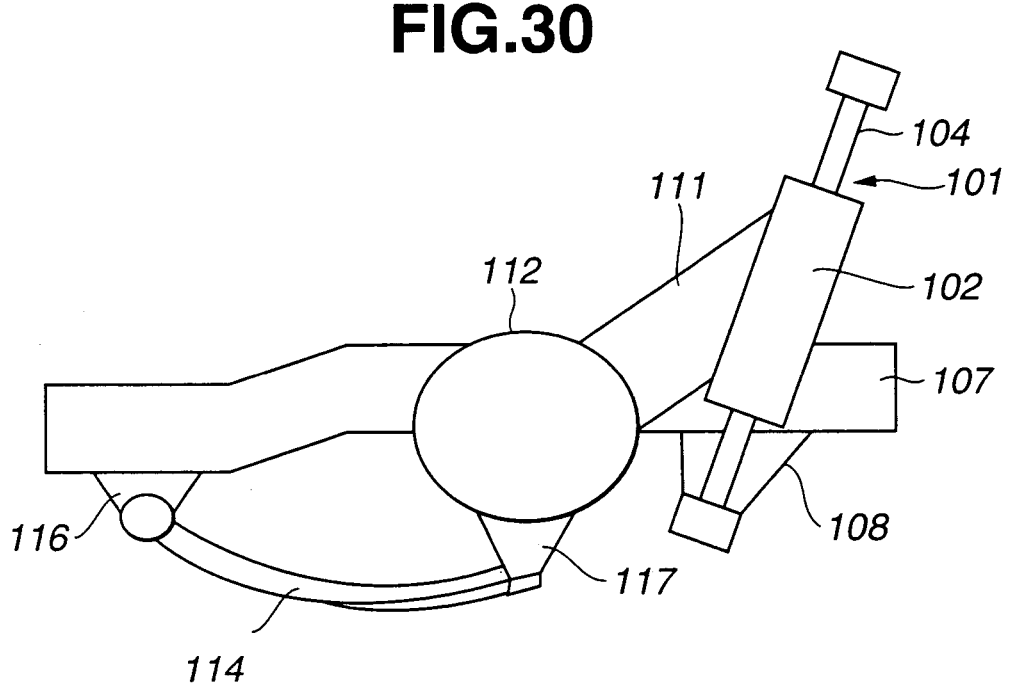
FIG. 30 is a schematic diagram showing a left rear independent suspension system for a wheeled vehicle in accordance with an eighth embodiment of the present invention, viewed from the left side of the vehicle.

Referring now to FIG. 30, there is shown a left rear independent suspension system in accordance with an eighth embodiment of the present invention. Attachment of leaf spring 114 is modified based on the suspension system in accordance with the fifth embodiment as shown in FIG. 23. That is, the front end of leaf spring 114 is directly coupled to side member 107 via bracket 116 without shackle 115.

Figure 31:
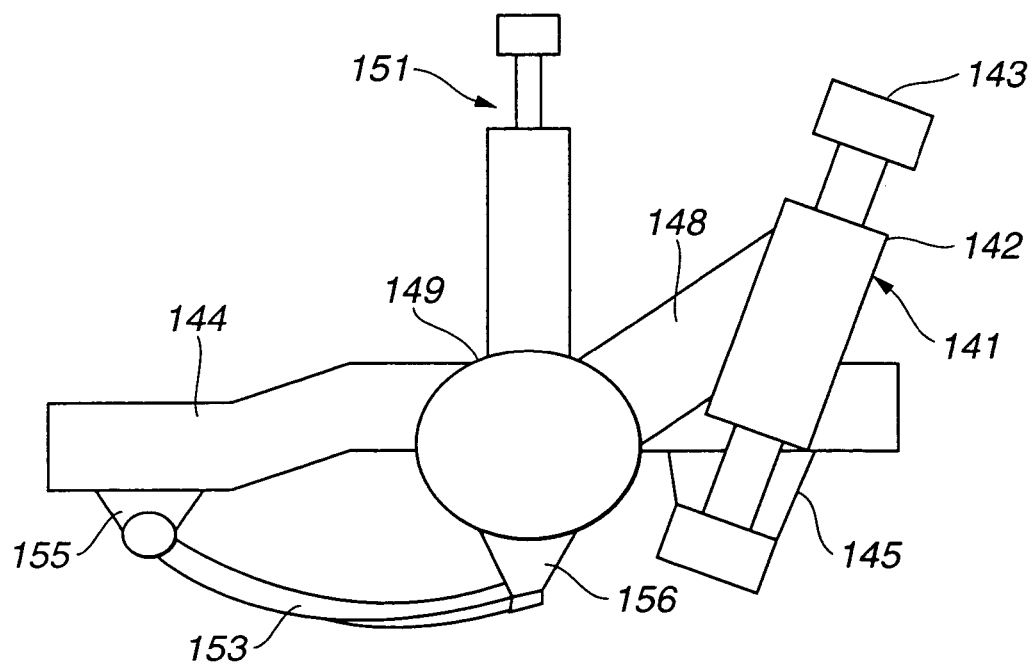
FIG. 31 is a schematic diagram showing a left rear independent suspension system for a wheeled vehicle in accordance with a ninth embodiment of the present invention, viewed from the left side of the vehicle.

Referring now to FIG. 31, there is shown a left rear independent suspension system in accordance with a ninth embodiment of the present invention. Attachment of leaf spring 153 is modified based on the suspension system in accordance with the seventh embodiment shown in FIG. 27. That is, the front end of leaf spring 153 is directly coupled to side member 144 via bracket 155 without shackle 154.

In these embodiments shown in FIGS. 30 and 31, the leaf spring serves for reducing a friction of a shock absorber or a guide member, as in the other cases.

A leaf spring elastically twisted and connected between a vehicle body and a wheel carrier serves for canceling a moment imposed on a guide such as a shock cylinder and a guide member, resulting in smooth motion of movable elements of the guide to enhance comfortability and driving stability of the vehicle.

In the foregoing embodiments, provided are the independent suspension systems suitable for rear wheels of front drive vehicles. However, these suspension systems may be modified for front independent suspension systems.

This application is based on a prior Japanese Patent Application No. 2003-364765 filed on Oct. 24, 2003, and a prior Japanese Patent Application No. 2003-419582 filed on Dec. 17, 2003. The entire contents of these Japanese Patent Applications Nos. 2003-364765 and 2003-419582 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An independent suspension system for a wheeled vehicle, comprising:
   a slide guide mounted on a vehicle body of the vehicle, and held against motion in a lateral direction of the vehicle;
   a slider mounted on the slide guide for motion in a vertical direction of the vehicle against a load imposed thereon;
   a wheel carrier mounted on the slider, for rotatably mounting thereon a wheel of the vehicle; and
   a leaf spring extending in a longitudinal direction of the vehicle, and connected between the wheel carrier and the vehicle body, wherein the leaf spring holds the wheel carrier against rotation on an axis of the motion of the slider,
   wherein the leaf spring is elastically twisted so as to bias, constantly at least while the wheel carrier is subject to a load from a road, the wheel carrier in a direction to positively increase a camber angle of the wheel carrier, so that a load is imposed on the slider to cancel a load that is imposed on the slider so as the cause a friction between the slide guide and the slider.

2. The independent suspension system as claimed in claim 1, further comprising:
   a coupler coupling the leaf spring to the wheel carrier for relative displacement in a longitudinal direction of the vehicle to absorb a displacement of the wheel carrier in a longitudinal direction of the vehicle.

3. The independent suspension system as claimed in claim 1, further comprising:
   a coupler coupling the leaf spring to the vehicle body for relative displacement in a longitudinal direction of the vehicle to absorb a displacement of the wheel carrier in a longitudinal direction of the vehicle.

4. The independent suspension system as claimed in claim 1, wherein:
   the slider includes a cylinder coupled to the wheel carrier;
   the slide guide includes a rod mounted on the vehicle body at one end;
   the rod held against motion in a lateral direction of the vehicle; and
   the cylinder mounted on the rod for motion in a vertical direction of the vehicle against a load imposed thereon.

5. The independent suspension system as claimed in claim 4, wherein the rod is mounted on the vehicle body at both ends.

6. The independent suspension system as claimed in claim 1, wherein the slide guide comprises:
   a first rod mounted on the vehicle body at one end;
   a second rod mounted on the vehicle body at one end; and
   the first rod and the second rod supporting the slider for motion in the vertical direction of the vehicle.

7. The independent suspension system as claimed in claim 6, wherein the slider comprises:
   a first cylinder slidably coupled to the first rod;
   a second cylinder slidably coupled to the second rod; and
   the first cylinder being connected coaxially to the second cylinder.

8. The independent suspension system as claimed in claim 6, wherein the slider comprises:
   a first cylinder slidably coupled to the first rod;
   a second cylinder slidably coupled to the second rod; and
   the first cylinder being connected to the second cylinder side by side so that the first rod and the second rod are oriented in opposite directions.

9. The independent suspension system as claimed in claim 1, wherein:
   the slider includes a rod coupled to the wheel carrier at one end;
   the slide guide includes a cylinder mounted on the vehicle body;
   the cylinder held against motion in a lateral direction of the vehicle; and
   the rod mounted on the cylinder for motion in a vertical direction of the vehicle against a load imposed thereon.

10. The independent suspension system as claimed in claim 9, wherein the rod is coupled to the wheel carrier at both ends.

11. The independent suspension system as claimed in claim 1, wherein the slider comprises:
    a first rod mounted on the wheel carrier at one end;
    a second rod mounted on the wheel carrier at one end; and
    the first rod and the second rod being supported on the slide guide for motion in the vertical direction of the vehicle.

12. The independent suspension system as claimed in claim 11, wherein the slide guide comprises:
    a first cylinder slidably coupled to the first rod;
    a second cylinder slidably coupled to the second rod; and
    the first cylinder being connected coaxially to the second cylinder.

13. The independent suspension system as claimed in claim 11, wherein the slide guide comprises:
    a first cylinder slidably coupled to the first rod;
    a second cylinder slidably coupled to the second rod; and
    the first cylinder being connected to the second cylinder side by side so that the first rod and the second rod are oriented in opposite directions.

14. The independent suspension system as claimed in claim 1, wherein a combination of the slide guide and the slider is configured to be a shock absorber to control an oscillatory motion between the slide guide and the slider.

15. The independent suspension system as claimed in claim 1, further comprising a shock absorber configured to control an oscillatory motion between the slide guide and the slider.

16. An independent suspension system for a wheeled vehicle, comprising:
    wheel support means for rotatably mounting thereon a wheel of the vehicle;

sliding means for supporting the wheel support means;
guiding means for supporting the sliding means for motion in a vertical direction of the vehicle against a load imposed on the sliding means; and
a leaf spring extending in a longitudinal direction of the vehicle, and connected between the wheel support means and a vehicle body of the vehicle on which the guiding means is mounted, wherein the leaf spring holds the wheel support means against rotation on an axis of the motion of the sliding means, wherein the leaf spring is elastically twisted so as to bias, constantly at least while the wheel support means is subject to a load from a road, the wheel support means in a direction to positively increase a camber angle of the wheel support means, so that a load is imposed on the sliding means to cancel a load that is imposed on the sliding means so as to cause a friction between the guiding means and the sliding means.

* * * * *